(12) United States Patent
Sharma et al.

(10) Patent No.: US 12,533,151 B2
(45) Date of Patent: Jan. 27, 2026

(54) REPOSITIONABLE TISSUE CAPTURE SYSTEM, DEVICE AND METHOD

(71) Applicants: BOSTON SCIENTIFIC MEDICAL DEVICE LIMITED, Galway (IE); BOSTON SCIENTIFIC SCIMED, INC., Maple Grove, MN (US)

(72) Inventors: Deepak Kumar Sharma, Muzaffarnagar (IN); Sharath Kumar G, Kanakapura (IN); Barry Weitzner, Acton, MA (US)

(73) Assignees: Boston Scientific Medical Device Limited, Galway (IE); Boston Scientific Scimed, Inc., Maple Grove, MN (US)

( * ) Notice: Subject to any disclaimer, the term of this patent is extended or adjusted under 35 U.S.C. 154(b) by 46 days.

(21) Appl. No.: 18/752,160

(22) Filed: Jun. 24, 2024

(65) Prior Publication Data
US 2025/0049462 A1 Feb. 13, 2025

Related U.S. Application Data

(60) Provisional application No. 63/531,713, filed on Aug. 9, 2023.

(51) Int. Cl.
*A61B 17/32* (2006.01)
*A61B 17/00* (2006.01)
(Continued)

(52) U.S. Cl.
CPC ........... *A61B 17/320016* (2013.01); *A61B 17/32056* (2013.01); *A61B 2017/00287* (2013.01);
(Continued)

(58) Field of Classification Search
CPC ............ A61B 17/00234; A61B 17/221; A61B 17/320016; A61B 17/32056;
(Continued)

(56) References Cited

U.S. PATENT DOCUMENTS

| 2002/0123761 A1 | 9/2002 | Barbut et al. |
| 2008/0103508 A1* | 5/2008 | Karakurum ...... A61B 17/00234 606/127 |

(Continued)

FOREIGN PATENT DOCUMENTS

| WO | 2004/082462 A2 | 9/2004 |
| WO | 2007/110864 A2 | 10/2007 |

*Primary Examiner* — Jocelin C Tanner
(74) *Attorney, Agent, or Firm* — Fay Kaplun & Marcin, LLP

(57) ABSTRACT

A device includes a capture assembly, a hollow member, a tube, and a control member. The assembly includes a capture sleeve received on a distal end of an insertion device and a flange mounted on the insertion device proximal of the sleeve. The hollow member, the tube, and the control member each have a proximal end accessible by the user. The tube pushes the sleeve distally off the insertion device when the tube is advanced distally through the hollow member. The control member includes a distal end forming a loop coupled around a circumference of a distal opening of the sleeve. The loop moves between a constricted configuration in which at least a portion of the loop is drawn proximally into the tube and an open configuration in which the loop is extended distally from the tube to open the loop and the distal opening of the sleeve.

20 Claims, 15 Drawing Sheets

(51) Int. Cl.
*A61B 17/3205* (2006.01)
*A61M 25/00* (2006.01)

(52) U.S. Cl.
CPC .............. *A61B 2017/00305* (2013.01); *A61B 2017/320064* (2013.01); *A61M 25/005* (2013.01); *A61M 25/0082* (2013.01)

(58) Field of Classification Search
CPC ........... A61B 2017/00287; A61B 2017/00305; A61B 2017/00867; A61B 2017/2215; A61B 2017/320064; A61M 25/005; A61M 25/0082
USPC .................................................. 606/113, 114
See application file for complete search history.

(56) References Cited

U.S. PATENT DOCUMENTS

2008/0312496 A1 12/2008 Zwolinski
2010/0152609 A1 6/2010 Zwolinski et al.

* cited by examiner

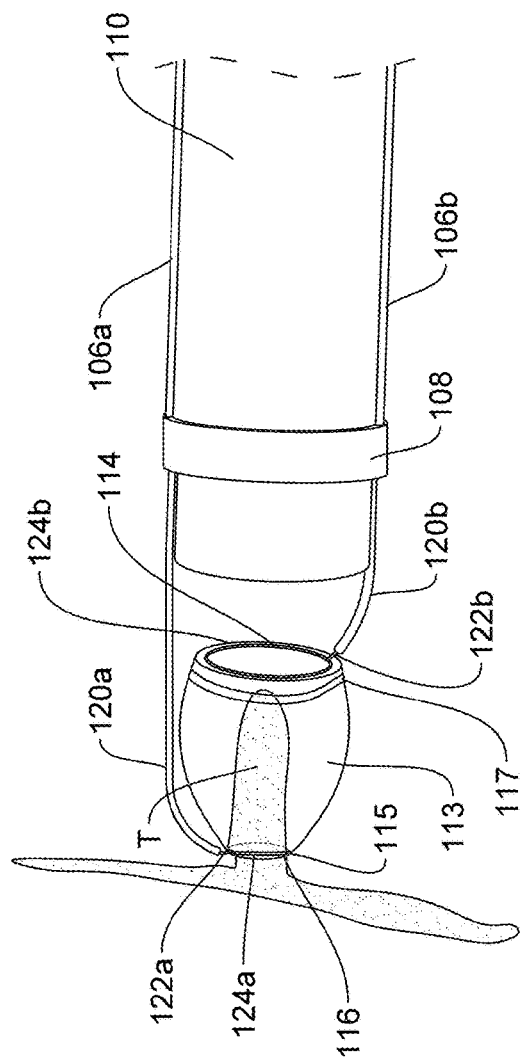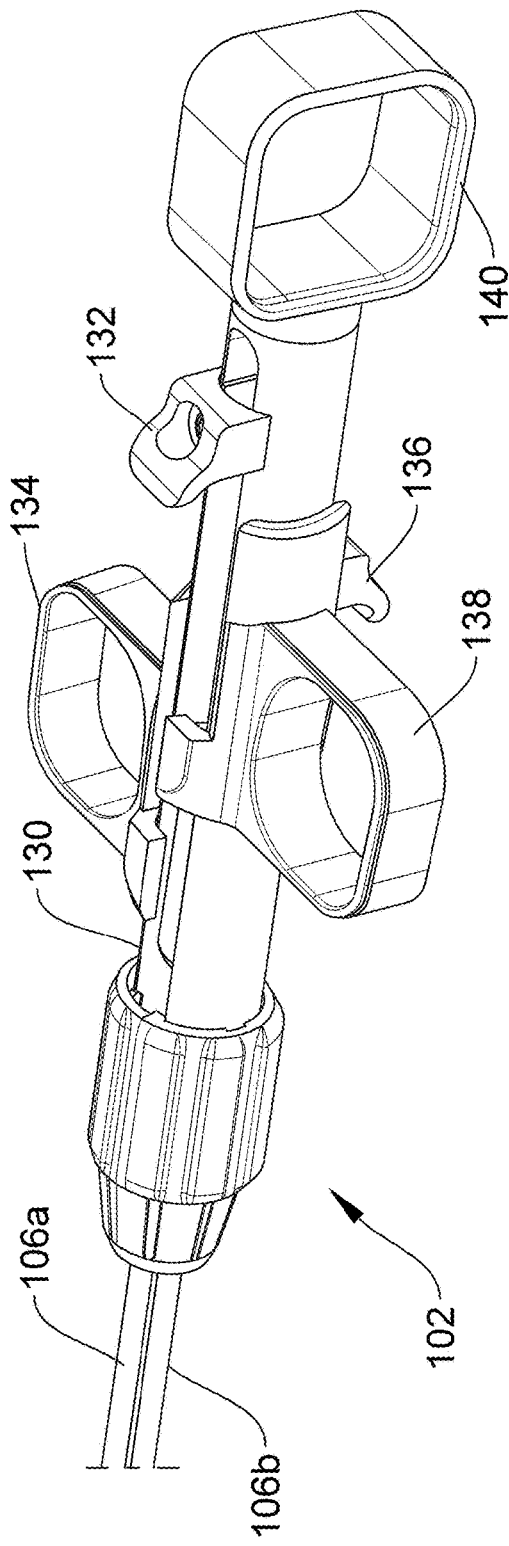
FIG. 7
FIG. 8

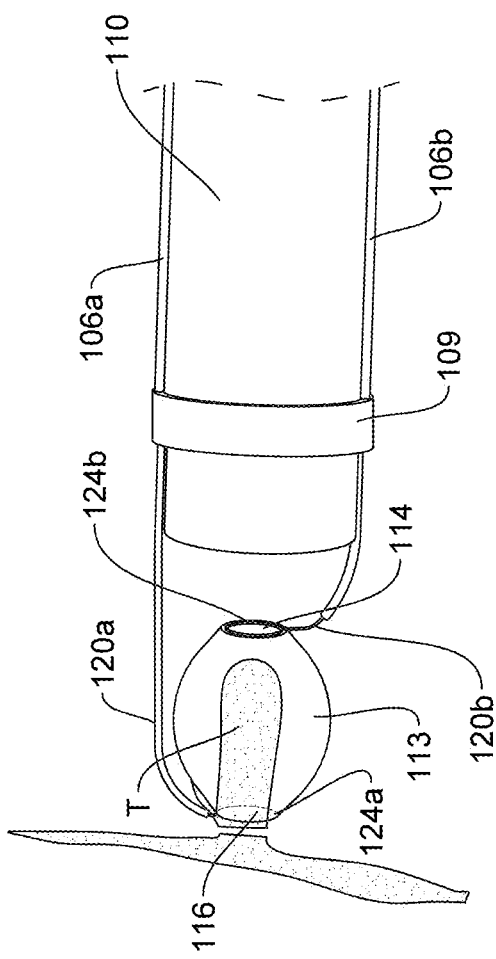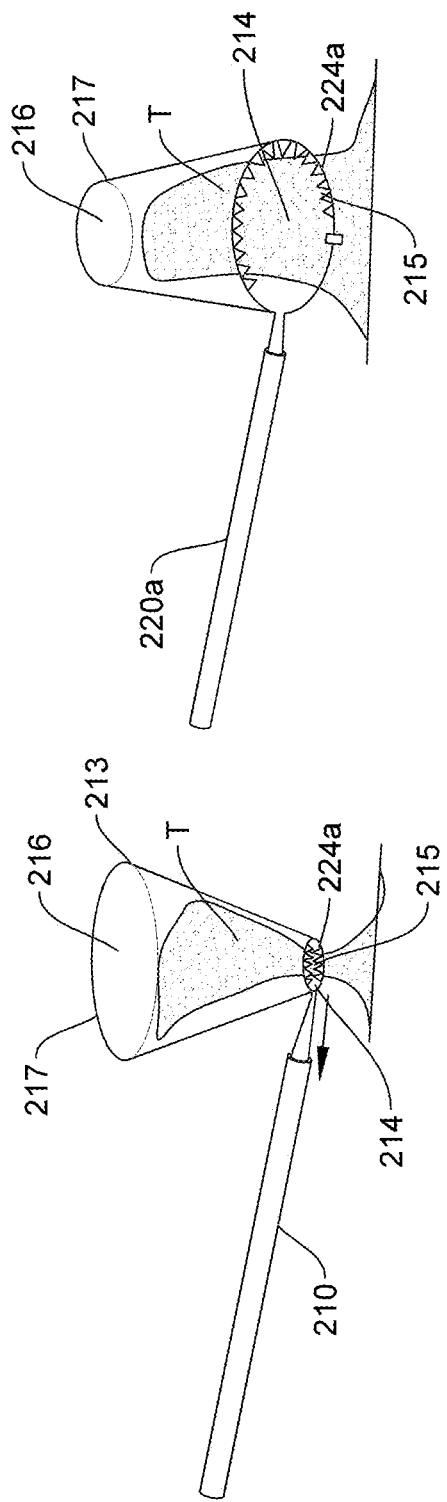
FIG. 11
FIG. 12A
FIG. 12B

REPOSITIONABLE TISSUE CAPTURE
SYSTEM, DEVICE AND METHOD

PRIORITY CLAIM

The present disclosure claims priority to U.S. Provisional Patent Application Ser. No. 63/531,713 filed Aug. 9, 2023; the disclosure of which is incorporated herewith by reference.

FIELD

The present disclosure relates to endoscopic devices and, in particular, relates to a device for capturing tissue for removal from a living body.

BACKGROUND

Full thickness resection (e.g., removal of a portion of an organ (e.g., the colon) of the digestive system including the full thickness of the wall of the organ) is often used as a treatment for cancer. These procedures entail certain risks including intrabdominal hypertension, loss of insufflation at the site of the full thickness resection and the possibility that the procedure will seed cancer cells to new areas. Furthermore, certain procedures for lesion removal that do not involve full thickness resection are, for various reasons, often unable to remove the entirety of a target portion of tissue (e.g., a tumor).

SUMMARY

The present disclosure relates to a device for treating tissue. The device includes a tissue capture assembly removably attachable to an insertion device configured to be inserted to a target site within a living body. The tissue capture assembly includes a tissue capture sleeve that, in an initial configuration, is removably received on a distal end of the insertion device and a flange that is removably mountable on the insertion device proximal of the tissue capture sleeve when the tissue capture sleeve is in the initial configuration. The first hollow member extends from a proximal end that remains, during use, outside the body accessible by a user to a distal end coupled to the flange.

In addition, the device includes a first tube slidably received within the first hollow member and extending from a proximal end that remains, during use, outside the body accessible by the user distally beyond the flange to a first tube distal end. The first tube is configured to push the tissue capture sleeve distally off of the insertion device when the first tube is advanced distally through the first hollow member. Furthermore, the device includes a first control member slidably received within the first tube and extending from a proximal end that remains, during use, outside the body accessible by the user to a distal end forming a first loop coupled around a circumference of a distal opening of the tissue capture sleeve. The first loop is configured to move between a constricted configuration in which at least a portion of the first loop is drawn proximally into the first tube and an open configuration in which the first loop is extended distally from the first tube to open the first loop and the distal opening of the tissue capture sleeve.

In an embodiment, the device further includes a handle have a handle body and a first actuator coupled to the proximal end of the first tube, wherein the first hollow member is coupled to the handle body and the first actuator is movably coupled to the handle body so that movement of the first actuator relative to the handle body moves the first tube proximally and distally within the first hollow member.

In an embodiment, the device further includes a second actuator coupled to the proximal end of the first control member. The second actuator is coupled to the first actuator so that movement of the second actuator relative to the first actuator moves the first control member proximally and distally within the first tube.

In an embodiment, the tissue capture sleeve includes an elastomeric loop coupled around a circumference of a proximal opening thereof, the elastomeric loop being biased toward a closed configuration so that, when the tissue capture sleeve is pushed distally off of the insertion device, the elastomeric loop pulls the proximal opening of the tissue capture sleeve closed.

In an embodiment, the device further includes a second hollow member extending from a proximal end that remains, during use, outside the body accessible by the user to a distal end coupled to the flange; and a second tube slidably received within the second hollow member and extending from a proximal end that remains, during use, outside the body accessible by the user distally beyond the flange to a second tube distal end. The second tube is configured to operate in conjunction with the first tube to push the tissue capture sleeve distally off of the insertion device when the second tube is advanced distally through the second hollow member.

The device also includes a second control member slidably received within the second tube and extending from a proximal end that remains, during use, outside the body accessible by the user to a distal end forming a second loop coupled around a circumference of a proximal opening of the tissue capture sleeve. The second loop is configured to move between the constricted configuration in which at least a portion of the second loop is drawn proximally into the second tube and the open configuration in which the second loop is extended distally from the second tube to open the second loop and the proximal opening of the tissue capture sleeve.

In an embodiment, the handle further comprises a third actuator coupled to the proximal end of the second tube. The second hollow member is coupled to the handle body and the third actuator is movably coupled to the handle body so that movement of the third actuator relative to the handle body moves the second tube proximally and distally within the second hollow member.

In an embodiment, the device further includes a fourth actuator coupled to the proximal end of the second control member. The fourth actuator is coupled to the third actuator so that movement of the fourth actuator relative to the third actuator moves the second control member proximally and distally within the second tube.

In an embodiment, the tissue capture sleeve is formed of one of silicon and a biocompatible plastic.

In an embodiment, the tissue capture sleeve is formed of one of Tyvek and Mylar.

In an embodiment, the first loop is formed of a shape memory material configured so that, when the first loop is extended from the first tube, the first loop assumes an open loop shape to draw the distal opening of the tissue capture sleeve to the open configuration.

In an embodiment, the first loop is formed of a biocompatible metal biased so that, when the first loop is extended from the first tube, the first loop assumes an open loop shape to draw the distal opening of the tissue capture sleeve to the open configuration.

In an embodiment, the first loop includes a plurality of radially inwardly facing tissue cutting features.

In addition, the present disclosure relates to a device for treating tissue. The device includes a catheter having a tissue capture assembly mounted on a distal portion thereof. The tissue capture assembly includes a tissue capture sleeve that, in an initial configuration, is removably received on a distal end of the catheter and a flange extending radially outward from an exterior of the catheter proximal of the tissue capture sleeve when the tissue capture sleeve is in the initial configuration.

The device also includes a first hollow member extending from a proximal end that remains, during use, outside a living body accessible by a user to a distal end coupled to the flange.

The device also includes a first tube slidably received within the first hollow member and extending from a proximal end that remains, during use, outside the body accessible by the user, distally beyond the flange to a first tube distal end. In addition, the device includes a first control member slidably received within the first tube and extending from a proximal end that remains, during use, outside the body accessible by the user to a distal end forming a first loop coupled around a circumference of a distal opening of the tissue capture sleeve. The first loop is configured to move between a constricted configuration in which at least a portion of the first loop is drawn proximally into the first tube and an open configuration in which the first loop is extended distally from the first tube to open the first loop and the distal opening of the tissue capture sleeve.

In an embodiment, the catheter is sized and shaped for insertion into a blood vessel and wherein the tissue to be targeted is a thrombus.

In an embodiment, the catheter is a braided catheter.

In addition, the present disclosure relates to a method for capturing tissue. The method includes inserting into a living body to a target site adjacent to the tissue to be treated, a tissue capture assembly removably attached to an insertion device with the tissue capture assembly including a tissue capture sleeve removably received on a distal end of the insertion device and a flange removably mountable on the insertion device proximal of the tissue capture sleeve, wherein the tissue capture sleeve is coupled to a first control member slidably received within a first tube with a first loop at the distal end of the first control member being coupled around a distal opening of the tissue capture sleeve; drawing a target portion of the tissue toward a distal end of the insertion device; moving the first tube distally to push the tissue capture sleeve distally off the insertion device so that the target portion of the tissue is received within the tissue capture sleeve; drawing the first control member proximally into the first tube to cinch the first loop closed over a portion of the tissue adjacent to the target portion of the tissue until the first loop closes the distal opening of the tissue capture sleeve; and when a user determines that a portion of the tissue captured within the tissue capture sleeve has been captured as desired, drawing the first control member further proximally into the first tube to sever the target portion of the tissue from a surrounding portion of the tissue.

In an embodiment, the tissue capture sleeve is coupled to a second control member slidably received within a second tube with a second loop at the distal end of the second control member coupled around a proximal opening of the tissue capture sleeve further comprising drawing the second control member proximally into the second tube to cinch the second loop closed to close the proximal opening of the tissue capture sleeve.

In an embodiment, the method further includes maintaining the proximal and distal openings of the tissue capture sleeve closed as the insertion device is withdrawn from the body.

In an embodiment, the first tube is coupled to a first actuator on a handle and wherein the first control member is coupled to a second actuator on the handle so that actuation of the first actuator moves the first tube proximally and distally relative to the insertion device and wherein movement of the second actuator moves the first control member proximally and distally relative to the first tube.

In an embodiment, the method further includes observing, after the tissue capture sleeve has been deployed over the target portion of the tissue, the tissue within the tissue capture sleeve to determine if the target portion of the tissue has been captured as desired; advancing, when the target portion of the tissue is determined not to have been captured as desired, the first control member distally out of the first tube to re-open the distal opening of the tissue capture sleeve; withdrawing the tissue capture sleeve off of the tissue that had been previously captured after the distal opening of the tissue capture sleeve has been re-opened; repositioning the insertion device; drawing a subsequent target portion of the tissue toward a distal end of the insertion device; moving the first tube distally to push the tissue capture sleeve distally off the insertion device so that the subsequent target portion of the tissue is received within the tissue capture sleeve; and drawing the first control member proximally into the first tube to cinch the first loop closed over the subsequent target portion of the tissue adjacent to the target portion of the tissue until the first loop closes the distal opening of the tissue capture sleeve.

BRIEF DESCRIPTION

FIG. 7 shows a perspective view of the distal assembly of FIG. 4 with a tissue covering sleeve preliminarily deployed over target tissue.

FIG. 8 shows a perspective view of the handle of FIG. 3A with a first knob of the handle in a first configuration.

FIG. 11 shows a perspective view of the distal assembly of FIG. 4 with tissue captured within the tissue covering sleeve severed from surrounding tissue.

FIG. 12A shows a perspective view of a tissue covering sleeve according to a further embodiment received over target tissue.

FIG. 12B shows a perspective view of the tissue covering sleeve of FIG. 12A with a distal end of the tissue covering sleeve cinched closed.

DETAILED DESCRIPTION

Figure 1:
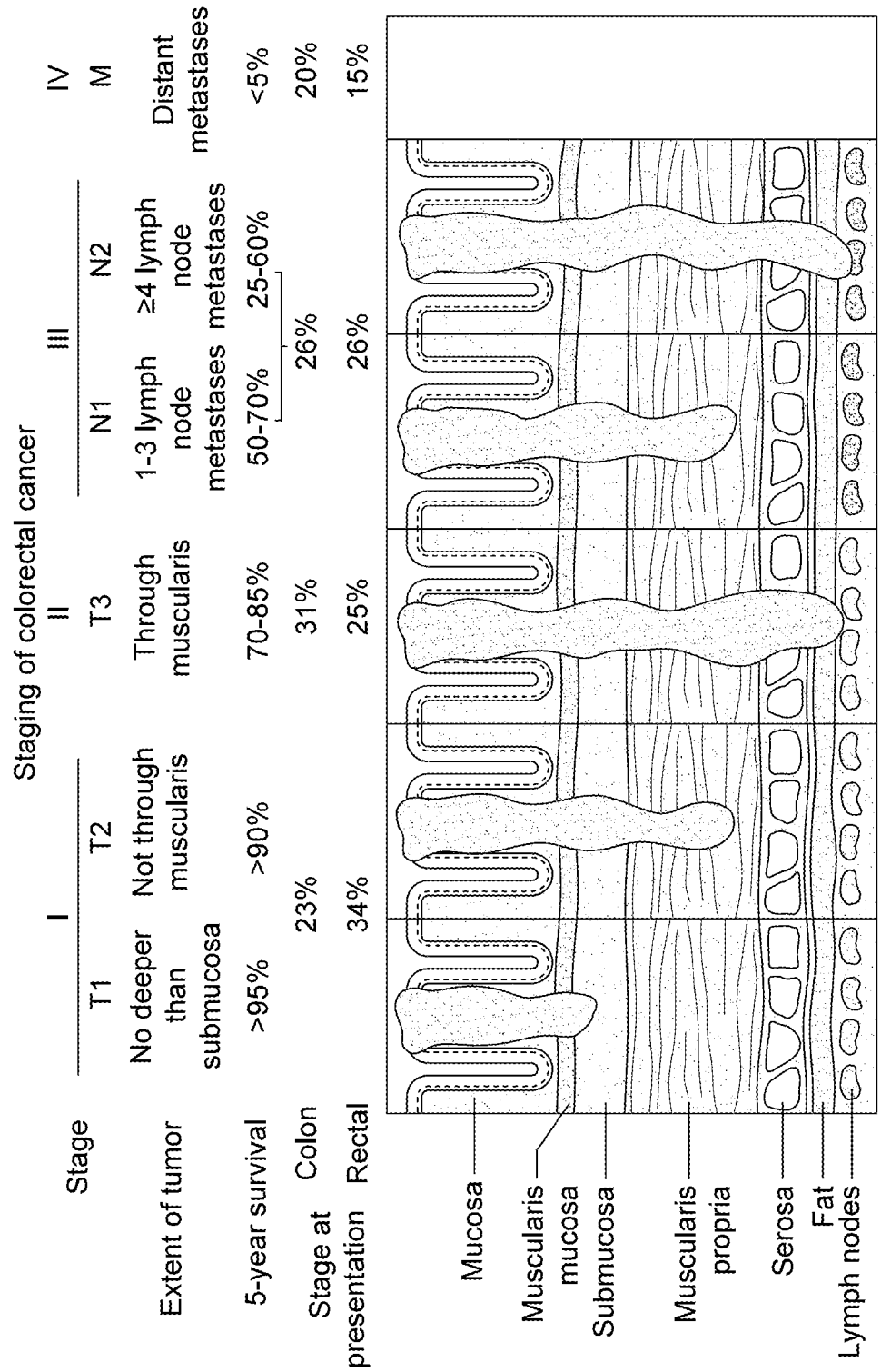
FIG. 1 shows a cross-section of a section of colon wall illustrating different stages and spreading of tumor growth.
Figure 2:
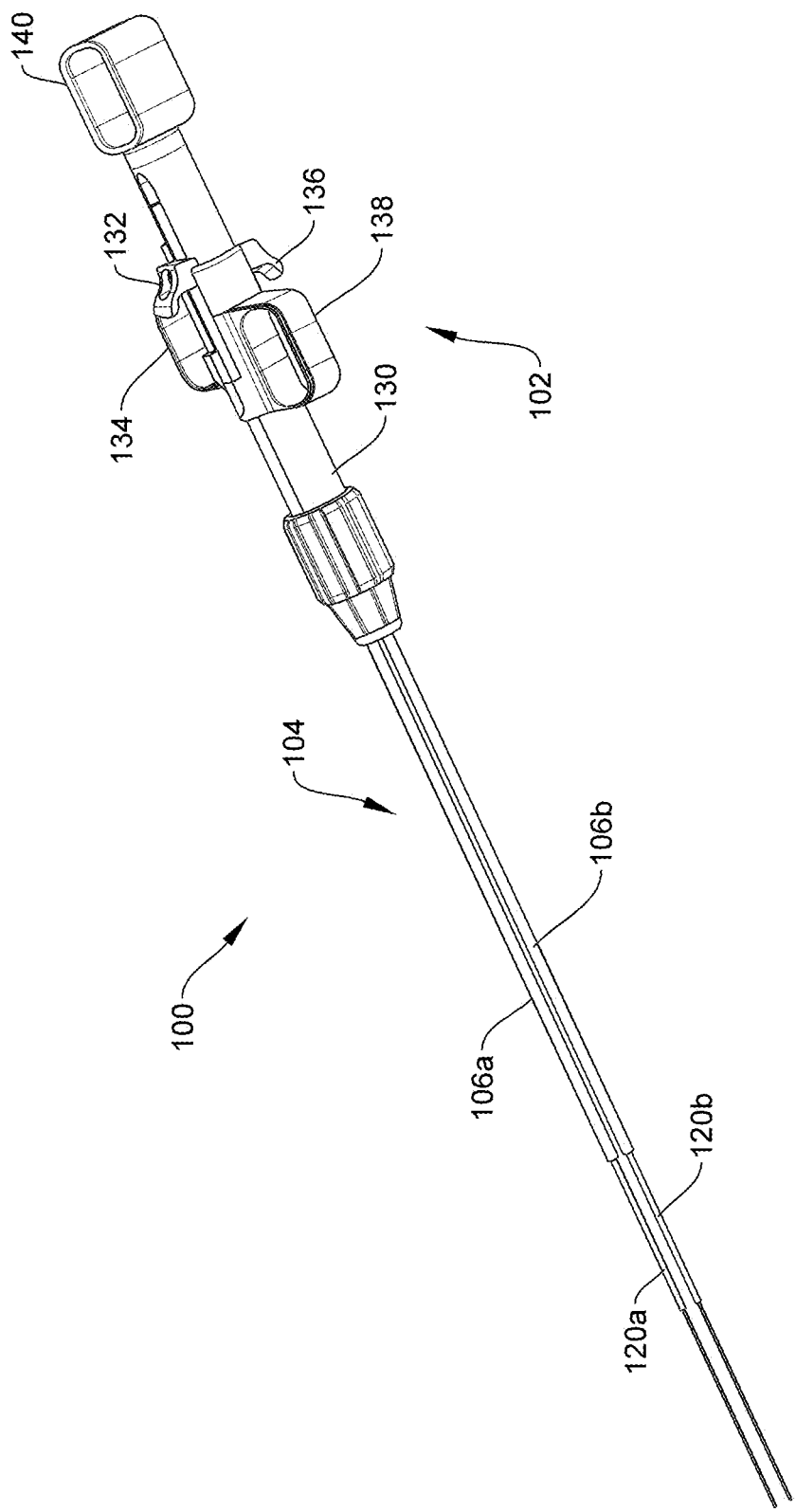
FIG. 2 shows a perspective view of a system for tissue removal according to an exemplary embodiment.

The present disclosure may be further understood with reference to the following description and the appended drawings, wherein like elements are referred to with the same reference numerals. The present disclosure relates to a device for resecting and withdrawing tissue from a living body in conjunction with a endoscope or other insertion device. The device is suitable for use with flexible devices inserted, for example, to target sites within the body via natural body lumens to separate a target portion of tissue from surrounding tissue and to safely remove the separated tissue from the body.

In this application the terms distal and proximal signify directions away from (distal) and toward (proximal) a user of the device. Thus, for devices according to the described embodiments that are used in conjunction with an endoscope or other insertion device, the proximal end of the device generally remains outside the body accessible to the user while the distal end is attached to the distal end of an endoscope and inserted into the body to a location adjacent to target tissue to be treated.

Those skilled in the art will understand that, although the devices according to the various embodiments are described in regard to the resection and removal of target portions of tissue, these devices may be used for the capture and removal of nearly any item from within the body. For example, devices according to these embodiments may be used in the capture and removal of stones (e.g., kidney or gall stones), foreign objects within the body (e.g., foreign objects that have been swallowed or that have been left in the body from medical procedures (e.g., shed parts from a medical device)). In addition, although these embodiments are described in conjunction with flexible insertions devices such as flexible endoscopes, these embodiments may also be used in conjunction with rigid insertion devices such as lithoscopes for, e.g., removal of lesions in the bladder. These embodiments may also be useful for the capture and removal of thrombi or plaque within blood vessels.

As seen in FIG. 1 and as would be understood by those skilled in the art, malignant growths in an organ such as the colon are staged based, in part, on the location (e.g., at or outside a lymph node) and the depth to which the growth has penetrated the tissue forming the wall of the organ. In addition, the depth of penetration of the growth into the wall of the organ will alter the plan of treatment of the lesion and, in cases where the growth has penetrated deeply into the wall, may require removal of a full-thickness portion of the wall of the organ. In all of these cases, it is important to minimize the risk that the removal of this tissue will result in the seeding of malignant cells to areas that were previously free from malignant growth.

FIGS. 2-11 show an exemplary embodiment according to the present disclosure of a system 100 for removing tissue which includes a handle 102 and an insertion section 104. The insertion section 104, in this embodiment, includes first and second flexible members 106a, 106b that extend to a distal tissue capture device 108. The tissue capture device 108 is configured to be mounted on the distal end of a flexible insertion device (e.g., a flexible endoscope 110). The tissue capture device 108 includes a flange 109 that is configured to be fixed to a distal end of the insertion device (e.g., configured to be friction fit at a fixed location on a distal end of the endoscope 110) and a flexible tissue capture member 112 that, in this embodiment is formed as a bag or a sleeve 113 formed of a flexible material such as rubber, silicon, a biocompatible plastic, such as Tyvek or Mylar, etc.

As those skilled in the art will understand, the sleeve 113, may be made of a clear material so that the user can observe the tissue that is captured within the sleeve 113.

Alternatively, the sleeve 113 may be formed of a wire mesh or other superstructure enclosed in a clear plastic. Those skilled in the art will understand that the mesh or other superstructure may be configured to hold the sleeve 113 in a desired shape when the sleeve 113 is not subject to outside forces (i.e., so that the sleeve 113 will assume a desired shape when it is moved distally off of the endoscope 110). In addition, the sleeve 113 may optionally include a first marker 115 at the distal end and/or a marker 117 at the proximal end of the sleeve 113 to facilitate observation of the limits of the sleeve 113 relative to the tissue to be captured.

Alternatively, the snare itself may form a marker as it may be visible through the sleeve 113 (e.g., if the sleeve 113 is transparent). Furthermore, those skilled in the art will understand that the sleeve 113 may be flexible so that, for example, it is stretched open by the bias of the first and second loops 124a, 124b as they are opened and so that this flexibility can help maintain proximal and distal openings 114, 116, respectively, of the sleeve 113 closed after tissue has been captured therein. As would be understood by those skilled in the art, this may help to maintain the captured tissue within the sleeve 113 to minimize the risk of seeding cancer or other diseased cells to currently healthy areas.

The sleeve 113 is configured, as will be described in more detail below to be received in an initial configuration on the distal end of the endoscope 110 (e.g., wrapped around the distal end of the endoscope 110 distal of the flange 109). The sleeve 113 of this embodiment includes the proximal opening 114 and the distal opening 116. As described below, each of the first and second flexible members 106a, 106b may be formed as a hollow member (e.g., a flexible coil) within which each of first and second flexible tubes 120a, 120b is slidably received. Each of the first and second tubes 120a, 120b is hollow and slidably receives each of first and second control member 122a, 122b (e.g., a flexible wire) therein.

The first tube 120a is coupled to the distal opening 116 of the sleeve 113 and the second tube 120b is coupled to the proximal opening 114 of the sleeve 113. The first and second tubes 120a, 120b respectively, are movable distally and proximally within their respective first and second flexible members 106a, 106b independently of one another. Thus, if the first and second tubes 120a, 120b are moved in unison, the sleeve 113 may be moved proximally and distally with respect to the distal end of the endoscope 110 and, if the first tube 120*a*, for example, is moved relative to the second tube 120*b*, the distal opening 116 of the sleeve 113 will be moved relative to the proximal opening 114 of the sleeve 113.

In addition, the first control member 122*a* received within the first tube 120*a* forms a first loop 124*a* that is coupled to and defines the distal opening 116, while the second control member 122*b* received within the second tube 120*b* forms a second loop 124*b* that is coupled to and defines the proximal opening 114. That is, the circumference of the first loop 124*a* is coupled to the sleeve 113 along a path extending around the circumference of the distal opening 116 so that, opening and closing the first loop 124*a* opens and closes the distal opening 116 of the sleeve 113. Similarly, the circumference of the second loop 124*b* is coupled to the sleeve 113 along a path extending around the circumference of the proximal opening 114 so that, opening and closing the second loop 124*b* opens and closes the proximal opening 114 of the sleeve 113.

Those skilled in the art will understand that the first and second loops 124*a*, 124*b* may be formed of a material configured to spring open when not constrained (e.g., by the corresponding one of the first and second tubes 120*a*, 120*b*). Thus, either or both of the first and second loops 124*a*, 124*b* and the corresponding proximal and distal openings 114, 116 of the sleeve 113 may be opened and closed independently of one another by drawing the first and second control members 122*a*, 122*b* proximally into or extending the first and second control members 122*a*, 122*b* distally from their respective ones of the first or second tubes 120*a*, 120*b* as would be understood by those skilled in the art.

Figure 3A:
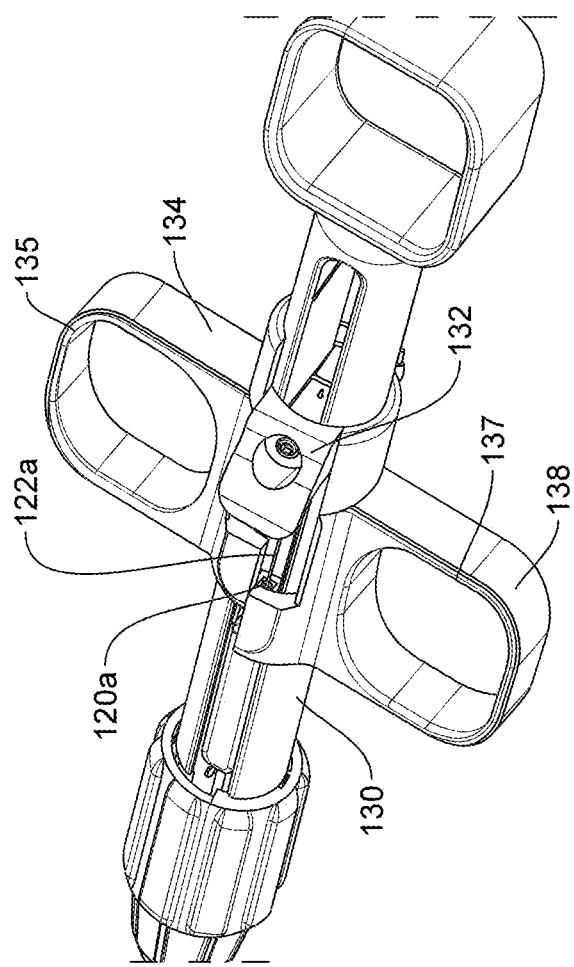
FIG. 3A shows a perspective view of a handle of the system of FIG. 2.
Figure 3B:
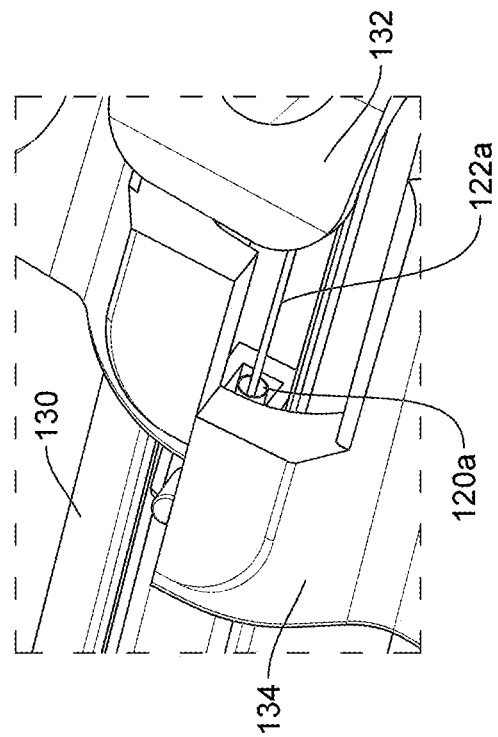
FIG. 3B shows a detailed perspective view of a first portion of the handle of FIG. 3A.
Figure 3C:
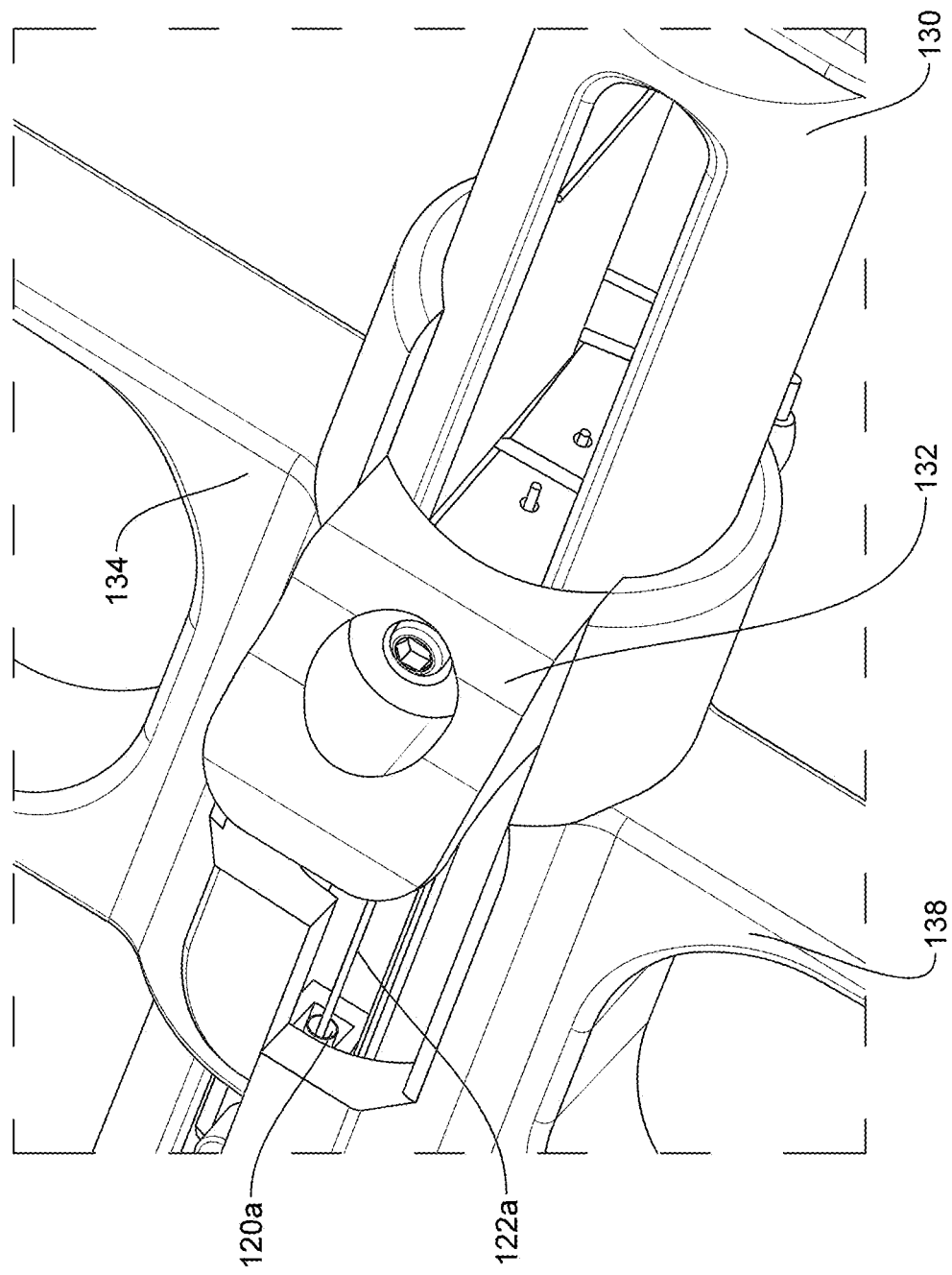
FIG. 3C shows a detailed perspective view of a second portion of the handle of FIG. 3A.
Figure 3D:
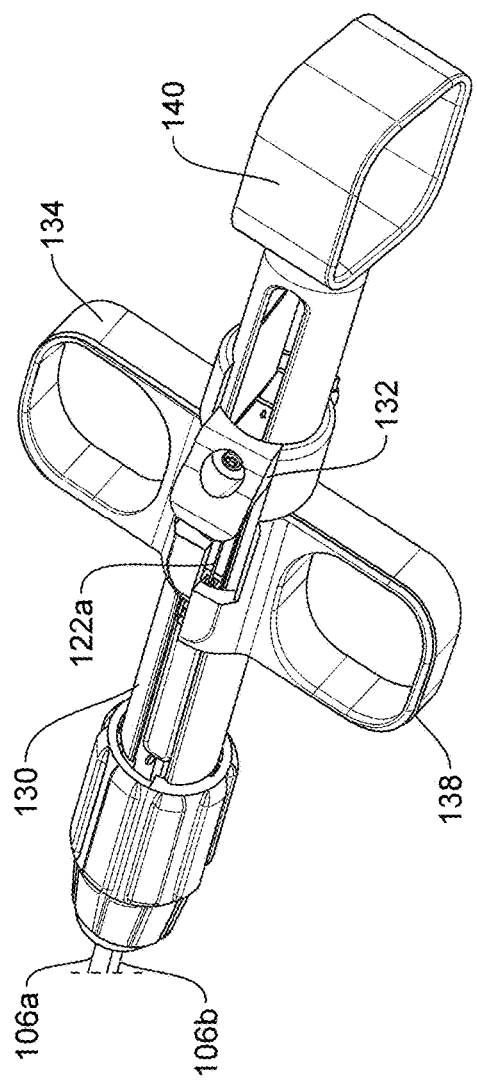
FIG. 3D shows a perspective view of the handle of FIG. 3A with a thumb ring thereof rotated relative to FIG. 3A.
Figure 4:
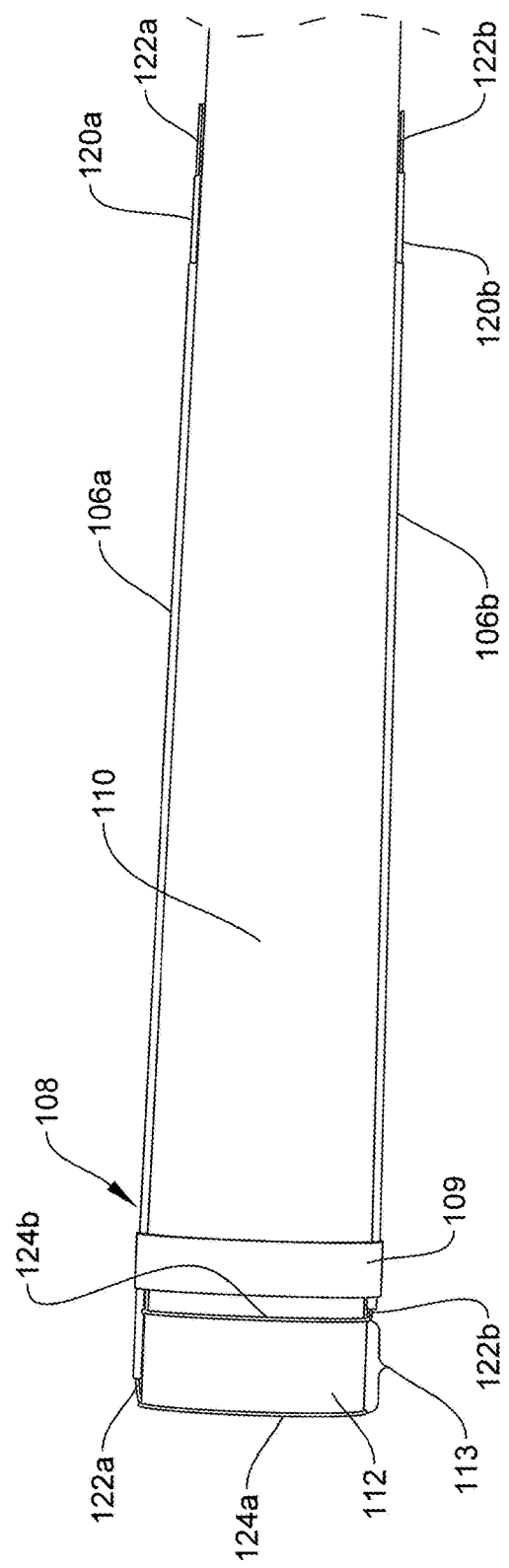
FIG. 4 shows a side view of a distal assembly of the system of FIG. 2.
Figure 5:
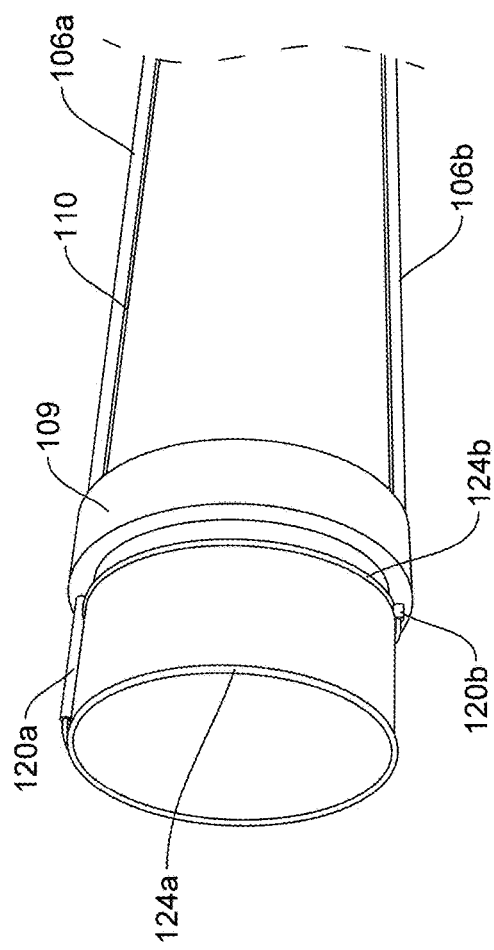
FIG. 5 shows a perspective view of the distal end of the distal assembly of FIG. 4.
Figure 6:
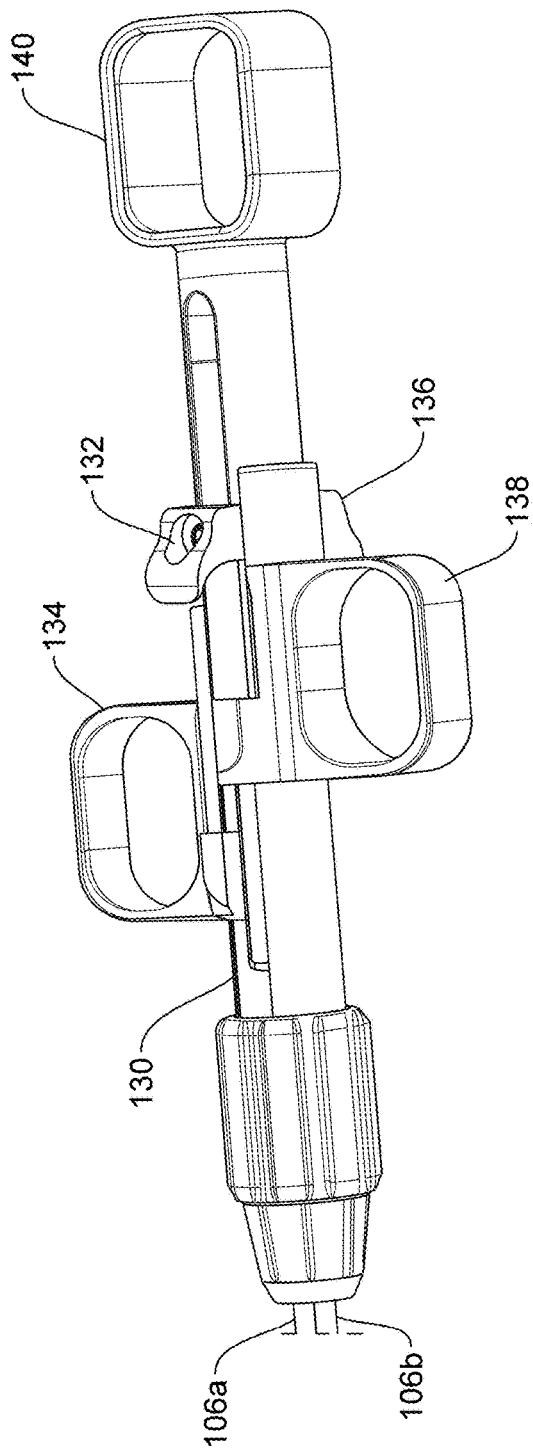
FIG. 6 shows a perspective view of the handle of FIG. 3A with spools of the handle in a first staggered configuration.
Figure 9:
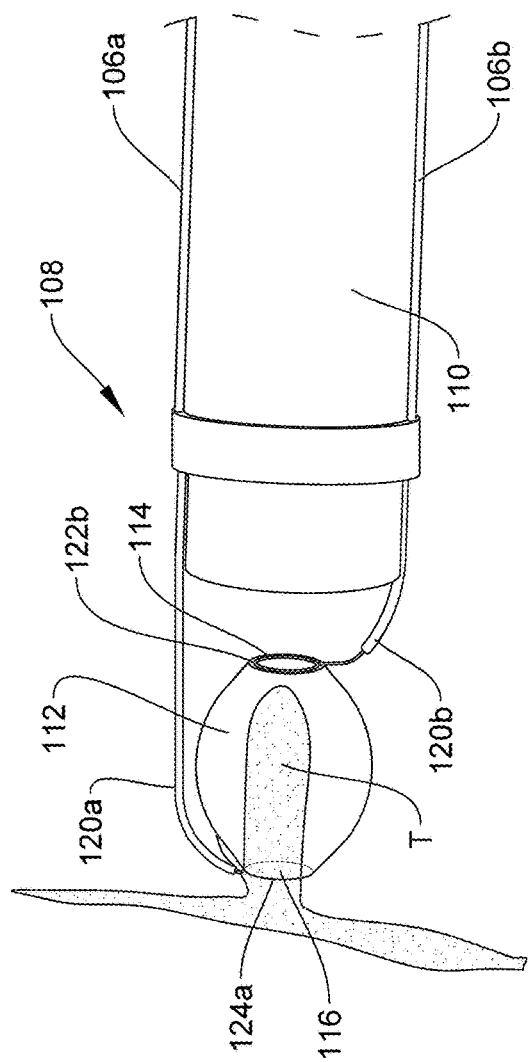
FIG. 9 shows a perspective view of the distal assembly of FIG. 4 with the tissue covering sleeve preliminarily deployed over target tissue with a proximal end of the tissue covering sleeve cinched closed.
Figure 10:
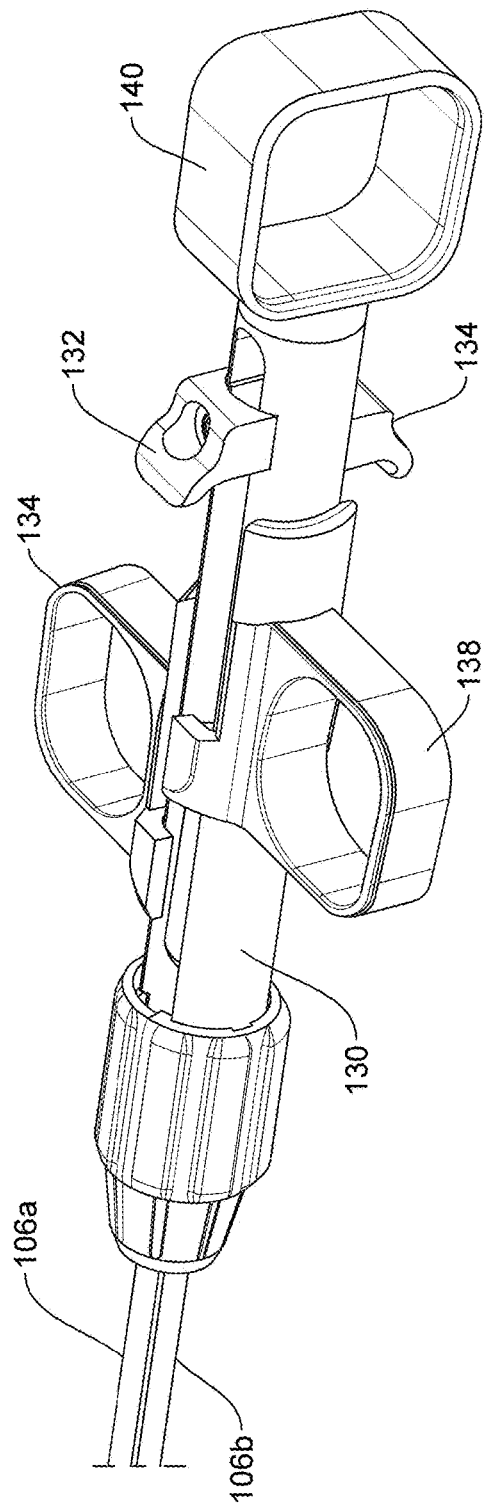
FIG. 10 shows a perspective view of the handle of FIG. 3A with a second knob of the handle in a first configuration.

FIG. 3A shows the first control member 122*a* which extends through a body 130 of the handle 102 to connect to a first knob 132 that is slidably connected to the body 130 of the handle 102. In addition, a first spool 134 is connected to the first tube 120*a* and is slidably mounted on the body 130 of the handle 102 and a proximal end of the first flexible member 106*a* is fixed to the body 130. The distal end of the first flexible member 106*a* is fixed to the flange 109. Similarly, the second control member 122*b* extends through the body 130 of the handle 102 to connect to a second knob 136 that is slidably connected to the body 130 and a second spool 138 is connected to the second tube 120*b* and slidably mounted on the body 130 of the handle 102 while and a proximal end of the second flexible member 106*b* is fixed to the body 130.

The distal end of the second flexible member 106*b* is fixed to the flange 109. Thus, movement of the first spool 134 distally relative to the body 130 moves the first tube 120*a* distally within the first flexible member 106*a* so that the first tube 120*a* moves distally out of the distal end of the first flexible member 106*a* to extend the distal end of the sleeve 113 distally off of the endoscope 110 and movement of the second spool 138 distally relative to the body 130 moves the second tube 120*b* distally within the second flexible member 106*b* so that the second tube 120*b* moves distally out of the distal end of the second flexible member 106*b* to extend the proximal end of the sleeve 113 distally off of the endoscope 110. As would be understood by those skilled in the art, if the first and second spools 134, 138, respectively, are moved distally in unison, the sleeve 113 will be moved distally off of the endoscope 110 without changing a distance between the proximal and distal openings 114, 116, respectively.

Alternatively, if one of the first and second spools 134, 138, respectively, is moved relative to the other, the distance between the proximal and distal openings 114, 116, respectively, may be shortened or lengthened as desired. Those skilled in the art will further understand that any of the first and second spools 134, 138 or the first and second knobs 132, 136 may include a lock that may be actuated by a user to hold the locked item in a current position so that the user may use his hand or finger for other purposes without worrying about any change in the position of the items controlled by the various actuators on the handle 102.

As indicated above, the first loop 124*a* may be formed of a biocompatible metal such as stainless steel with a bias toward a shape in which the loop is open or of a shape memory material (e.g., Nitinol, an alloy of Nitinol and cobalt, plastics such as PEEK and polycarbonate, etc.) configured so that, as the first loop 124*a* is in a first position in which a portion of the first loop 124*a* is received within the first tube 120*a*, the first loop 124*a* and, consequently, the distal opening 116, is constricted (i.e., a diameter of the distal opening 116 is reduced). Due to the bias or shape memory property of the first loop 124*a*, if the first control member 122*a* is advanced distally relative to the first tube 120*a*, a greater portion of the first loop 124*a* will be moved distally outside the first tube 120*a* so that the first loop 124*a* will expand and open the distal opening 116 further.

Similarly, the second loop 124*b* may be formed with a bias or of a shape memory material configured so that, when the second loop 124*b* is in a first position in which a portion of the second loop 124*b* is received within the second tube 120*b*, the second loop 124*b* and, consequently, the proximal opening 114, is constricted (i.e., a diameter of the proximal opening 114 is reduced). the bias or shape memory property of the second loop 124*b*, operates so that, when the second control member 122*b* is advanced distally relative to the second tube 120*b*, a greater portion of the second loop 124*b* will be moved distally outside the second tube 120*b* so that the second loop 124*b* will expand and further open the proximal opening 114.

As would be understood by those skilled in the art, the handle 102 of this embodiment includes an optional thumb ring 140 fixed to the body 130 and the first and second spools 134, 138 also include optional first and second finger loops 135, 137, respectively, to aid in moving the first and second spools 134, 138 relative to the body 130. Furthermore, those skilled in the art will understand that either or both of the first and second loops 124*a*, 124*b* may be coupled to a source of RF or other energy to aid in the resection of target tissue and/or to cauterize any resulting wound although this is more likely to be useful in regard to the first loop 124*a*.

In use, the tissue capture device 108 is mounted on the distal end of an endoscope 110 by moving the flange 109 over the distal end of the endoscope 110 until the flange is in a desired position on the endoscope 110. At the same time, the sleeve 113 is drawn over the distal end of the endoscope 110 by moving the endoscope 110 through the proximal opening 114 and the distal opening 116 so that the sleeve 113 is wrapped around the distal end of the endoscope 110. In this configuration, the first and second flexible members 106*a*, 106*b* are, in this embodiment, preinstalled coupled to the flange 109 and the body 130 of the handle 102 and with the first and second tubes 120*a*, 120*b* extending through the flange 109. The first and second control members 122*a*, 122*b* are, at this point, extended distally out of the distal ends of the first and second tubes 120*a*, 120*b*, respectively, with the first and second loops 124*a*, 124*b* coupled to the distal opening 116 and the proximal opening 114, respectively, of the sleeve 113.

In this configuration, the endoscope 110 and the tissue capture device 108 are inserted into a body of a patient (e.g., within a body lumen accessed via a natural body orifice) and guided through the body to a position adjacent to a target portion of tissue T to be treated. The user may observe the target tissue, for example, using the vision system of the endoscope 110 (e.g., via a lens mounted on a distal face of the endoscope 110). The user then grasps or otherwise draws the target tissue into a desired position relative to the distal end of the endoscope 110. For example, a polyp or other lesion that projects out from the wall of the target organ may be controlled using a grasper or suction applied through a working channel of the endoscope 110 (e.g., a working channel that opens to the distal face of the endoscope 110) so that tissue drawn toward the opening of the working channel is drawn against the distal face of the endoscope 110.

As would be understood by those skilled in the art, certain lesions (e.g., sessile polyps) may be flat along a surface of the wall of the target organ. In such cases, the user may inject fluid under the target lesion to lift the lesion away from the surface of the rest of the wall of the organ or otherwise treat this tissue to make it more readily lifted and cut away from the surrounding tissue. In any case, the user moves the target tissue until it is positioned as desired (e.g., so that when the sleeve 113 is moved distally off of the endoscope 110, the target tissue will pass through the distal opening 116 into the sleeve 113). Specifically, as indicated above, the sleeve 113 is held open as it is wrapped or stretched around the distal end of the endoscope 110.

The user then advances the first knob 132 distally to maintain the distal opening 116 open and advances the first and second spools 134, 138 distally in unison to advance the sleeve 113 distally off of the endoscope 110 with the target tissue T passing through the distal opening 116 into the sleeve 113. When the distal end of the sleeve 113 reaches a desired location (e.g., when the first loop 124a and the distal opening 116 are positioned around a portion of tissue leaving a desired margin beyond the target lesion, the user holds the first spool 134 in position and draws the first knob 132 proximally to retract the first control member 122a and the first loop 124a into the first tube 120a to constrict the first loop 124a and the distal opening 116 of the sleeve 113 around the tissue constituting the margin around the target tissue T (with the entirety of the target tissue T as well as the tissue forming the margin) within the sleeve 113 (e.g., see FIG. 7). At the same time, the user may retract the second knob 136 proximally to close the proximal opening 114 of the sleeve 113 so that the proximal end of the target tissue T is closed within the sleeve 113 (e.g., see FIG. 9).

The user may then observe the tissue within the sleeve 113 and the surrounding tissue to determine if the target tissue T and the desired margin of tissue surrounding the tissue T has been captured within the sleeve 113. If the user decides that the tissue T and margin tissue has not been captured as desired, the user may reopen the proximal and distal openings 114, 116, by advancing the first and second knobs 132, 136 distally relative to the body 130 of the handle 102 and, then draw the first and second spools 134, 138 proximally relative to the body 130 to pull the sleeve 113 proximally off of the previously captured tissue and pull the sleeve 113 back onto the distal end of the endoscope 110. The user may observe the target tissue, reposition the endoscope 110 as desired and repeat these steps to capture a new portion of tissue within the sleeve 113.

When the user is satisfied that the desired portion of tissue T along with the desired margin of healthy tissue has been captured within the sleeve 113 and the proximal and distal openings 114, 116 have been closed over this tissue, the user may sever the captured tissue from surrounding tissue by retracting the first knob 132 proximally until the first loop 124a has tightened around the base of the captured tissue tightly enough to sever this tissue from the surrounding tissue (e.g., see FIG. 11). Those skilled in the art will understand that the user may also apply RF or other energy (in a monopolar or bipolar arrangement as desired) to facilitate the severing of this tissue and or to help seal (e.g., cauterize) the wound.

The user may then maintain the first and second knobs 132, 136, respectively, in their fully retracted positions to effectively seal the proximal and distal openings 114, 116 of the sleeve 113 so that the captured tissue T is sealed within the sleeve 113 during removal from the body. As indicated above, either or both of the first and second knobs 132, 136 may include a locking mechanism that will hold the knobs in their proximal-most positions (i.e., with the proximal and distal openings 114, 116 closed) until the endoscope 110 and the tissue capture device 108 are removed from the body. Thus, the captured tissue is maintained within the sleeve 113 out of contact with other tissues or fluids and the risk of seeding diseased cells from the captured tissue is minimized.

Those skilled in the art will further understand that the sleeve 113 (and/or any superstructure or other structure that maintains the sleeve 113 in a desired shape) may take any of a variety of shapes. For example, as shown in FIGS. 12A and 12B, a device according to a further embodiment may include a first loop 224a that opens and closes a distal opening 216 of a sleeve 213 in the same manner described above for the distal opening 116 of the sleeve 113 with regard to the first loop 224a. However, the first loop 224a includes a plurality of tissue cutting teeth 215 that extend radially inwardly from the first loop 224a. As would be understood by those skilled in the art, the teeth 215 are configured to cut the tissue as the first loop 224a is drawn tight around the captured tissue.

In addition, this sleeve has a conical shape in which the proximal opening 214 is biased to close on its own (e.g., via the inclusion of a flexible band loop 217 around the proximal opening 214) as soon as it is removed from the distal end of the endoscope 210. In this case, the system could dispense with any connection to the proximal end of the sleeve 213 as the proximal end of the sleeve 213 would close immediately upon being moved distally off of the endoscope 210 and will not need to be opened or closed after the sleeve 213 has been deployed off of the distal end of the endoscope 210.

Those skilled in the art will understand that, in FIG. 12A, the proximal opening 214 of the sleeve 213 is still stretched around the distal end of the endoscope 210 and, as shown in FIG. 12B, after the sleeve 213 has been pulled fully off of the endoscope 210, the proximal opening 214 has been closed by the band loop 217. Those skilled in the art will recognize the that the teeth 215 may be employed with the sleeve 213 and the first loop 214a and, alternatively, that the sleeve 213 may be employed with a first loop 224a including none of the teeth 215 in the same manner as shown for the first loop 124a.

Figure 13:
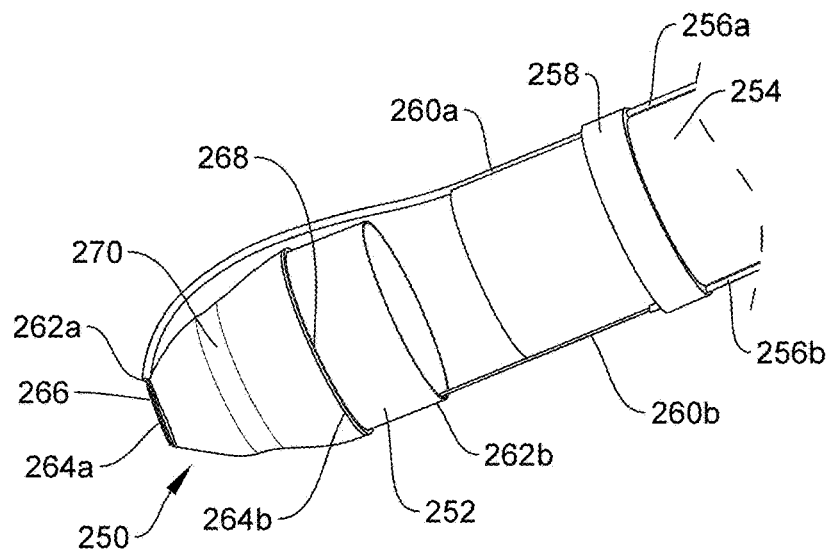
FIGS. 13-15 show a system according to another exemplary embodiment of the present disclosure.
Figure 14:
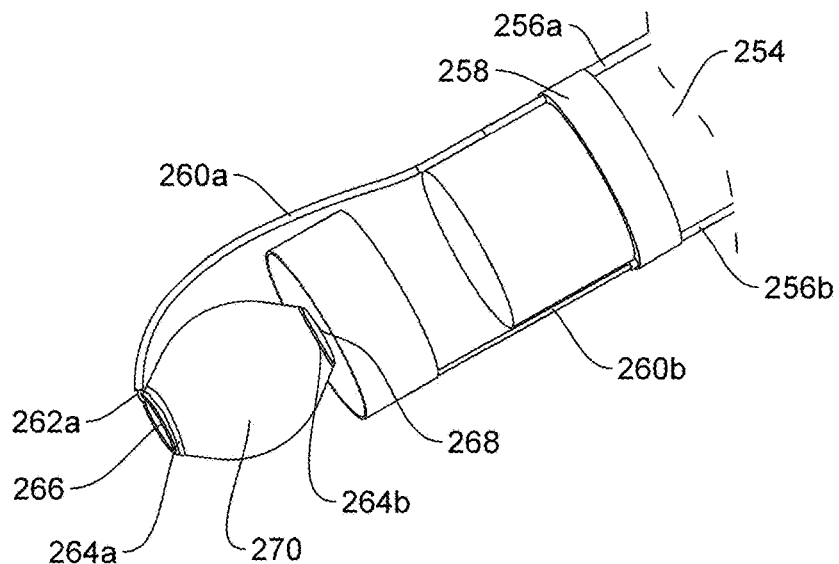
Figure 15:
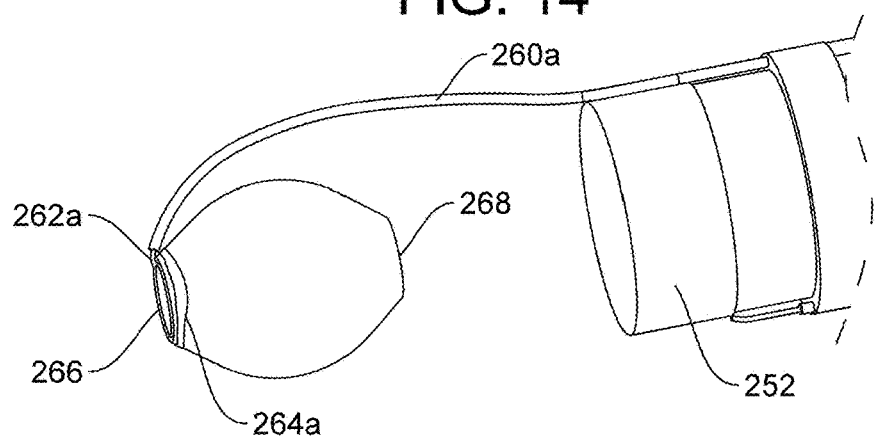

FIGS. 13-15 show a system 250 that operates in a manner substantially similar to that described above in regard to the sleeve 213. In this system 250, however, a cap 252 is slidably received around the distal end of the endoscope 254. The system 250 includes a handle similar to the handle 102 including flexible members 256a and 256b that extend from the handle to a flange 258 that is mounted around the distal portion of the endoscope 254 in a manner similar to the flange 109 described above.

The flexible members 256a, 256b slidably receive first and second tubes 260a and 260b, respectively, therein. The first and second tubes 260a and 260b slidably receive therein first and second control members 262a, 262b which extend distally out of the distal ends of the first and second tubes 260a, 260b, respectively, with first and second loops 264a, 264b coupled to the distal opening 266 and the proximal opening 268, respectively, of a sleeve 270. The proximal end of the sleeve 270 and the second loop 264b are, in the initial configuration, received around the distal end of the cap 252. In the initial configuration, the cap 252 is retracted over the distal end of the endoscope 254 and the proximal end of the sleeve 270 is stretched open around the cap 252. At this point, the distal end of the sleeve 270 is stretched open over the distal end of the endoscope 254 so that tissue may be drawn against the distal end of the endoscope 254 as described above.

The user may extend the cap 252 distally by advancing the second tube 260b which is, in this embodiment, coupled to the cap 252. The distal end of the sleeve 270 then moves off of the distal end of the endoscope 254 and the distal end of the sleeve 270 constricts around the captured tissue in the same manner described above in regard to the sleeve 213. The user may then determine whether the desired portion of tissue has been captured within the sleeve 270 as desired. If the user determines that the target portion of tissue has not been captured as desired, the user may retract the cap 252 proximally by retracting the second tube 260b until the cap 252 moves back onto the distal end of the endoscope 254 and the distal end of the sleeve 270 is then reopened as it is stretched over the distal end of the endoscope 254. This releases the previously captured tissue.

The user may then observe the target tissue, reposition the endoscope 254 until the endoscope is positioned as desired in regard to the target tissue to be captured. The user then redeploys the sleeve 270 in the same manner described above and, if the user determines that the tissue has been captured as desired, the user can further advance the first tube 260a while holding the cap 252 stationary until the proximal end of the sleeve 270 is pulled off of the cap 252 and the proximal end of the sleeve 270 constricts to close the proximal opening of the sleeve 270. The user may then operate the first loop 264a until the captured tissue is resected from the surrounding tissue and the sleeve 270 including the captured tissue can be safely removed from the body along with the endoscope 254 and the rest of the system 250.

Figure 16:
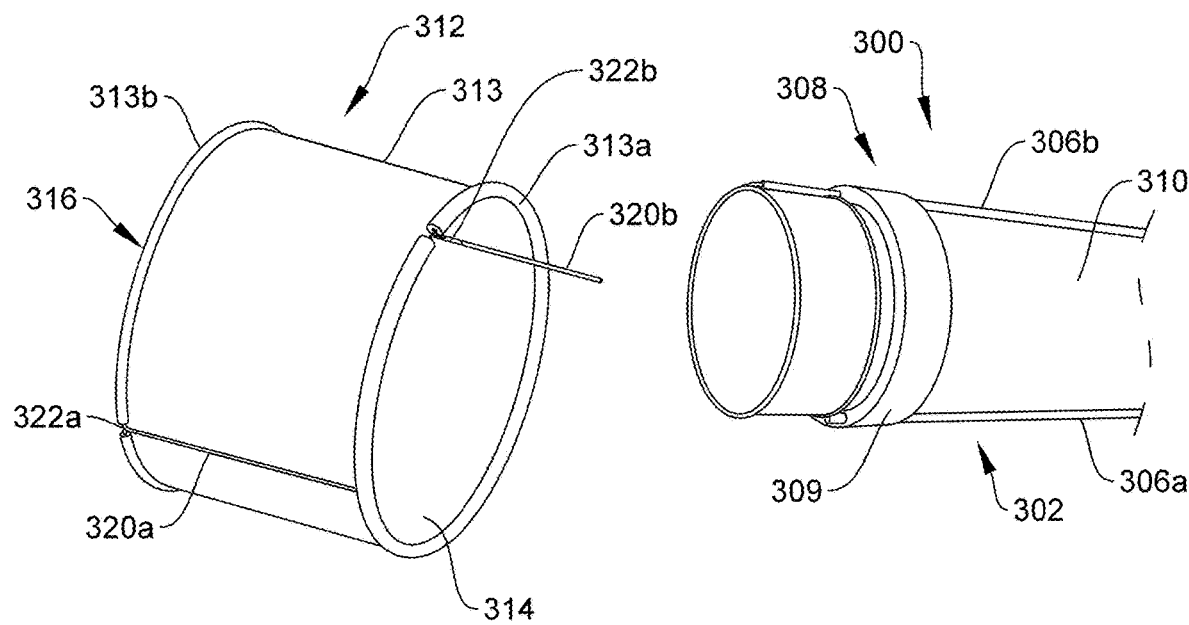
FIGS. 16 and 17 show a distal portion of the system shown in FIGS. 13-15.
Figure 17:
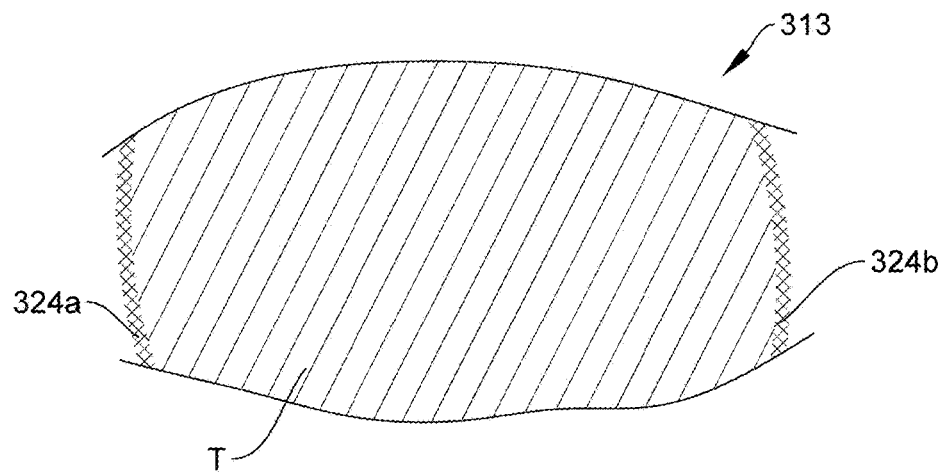

FIGS. 16 and 17 show a distal portion 302 of a system 300 according to a further embodiment which, except as specifically noted below, is substantially similar in structure and operation to the previously described embodiments. The system 300 includes a handle similar to the handle 102 described above and an insertion section that, in this embodiment, includes first and second flexible members 306a, 306b that extend to a distal tissue capture device 308 that is configured to be mounted on the distal end of a flexible insertion device (e.g., a flexible endoscope 310).

The tissue capture device 308 includes a flange 309 that is configured to be fixed to a distal end of the insertion device (e.g., configured to be friction fit at a fixed location on a distal end of the endoscope 310) and a flexible tissue capture member 312 that, in this embodiment is formed as a bag or sleeve 113 formed of a stretchable, flexible material such as rubber, silicon, a biocompatible plastic, such as Tyvek or Mylar, etc. The sleeve 313 of this embodiment is substantially cylindrical with the proximal end 313a folded back over a portion of the sleeve 313 to form, at the proximal end 313a, a pocket within which is received a first loop 324a while the distal end 313b is also folded back over a portion of the sleeve 313 to form, at the distal end 313b, a pocket within which is received a second loop 324b.

The sleeve 313 is configured to be received in an initial configuration on the distal end of the endoscope 310 (e.g., wrapped around the distal end of the endoscope 310 distal of the flange 309). The sleeve 313 of this embodiment includes the proximal opening 314 and the distal opening 316. Each of the first and second flexible members 306a, 306b is formed as a hollow member within which each of first and second flexible tubes 320a, 320b is slidably received. Each of the first and second tubes 320a, 320b is hollow and slidably receives each of first and second control member 322a, 322b (e.g., a flexible wire) therein.

As shown in FIG. 17, when the sleeve 313 is closed (as the first and second control members 322a, 322b and the first and second loops 324a, 324b are drawn into the first and second tubes 320a, 320b, respectively), the tissue T captured within the sleeve 313 is enclosed by the first and second closed loops 324a, 324b without placing the material of the sleeve 313 in tension.

Figure 18A:
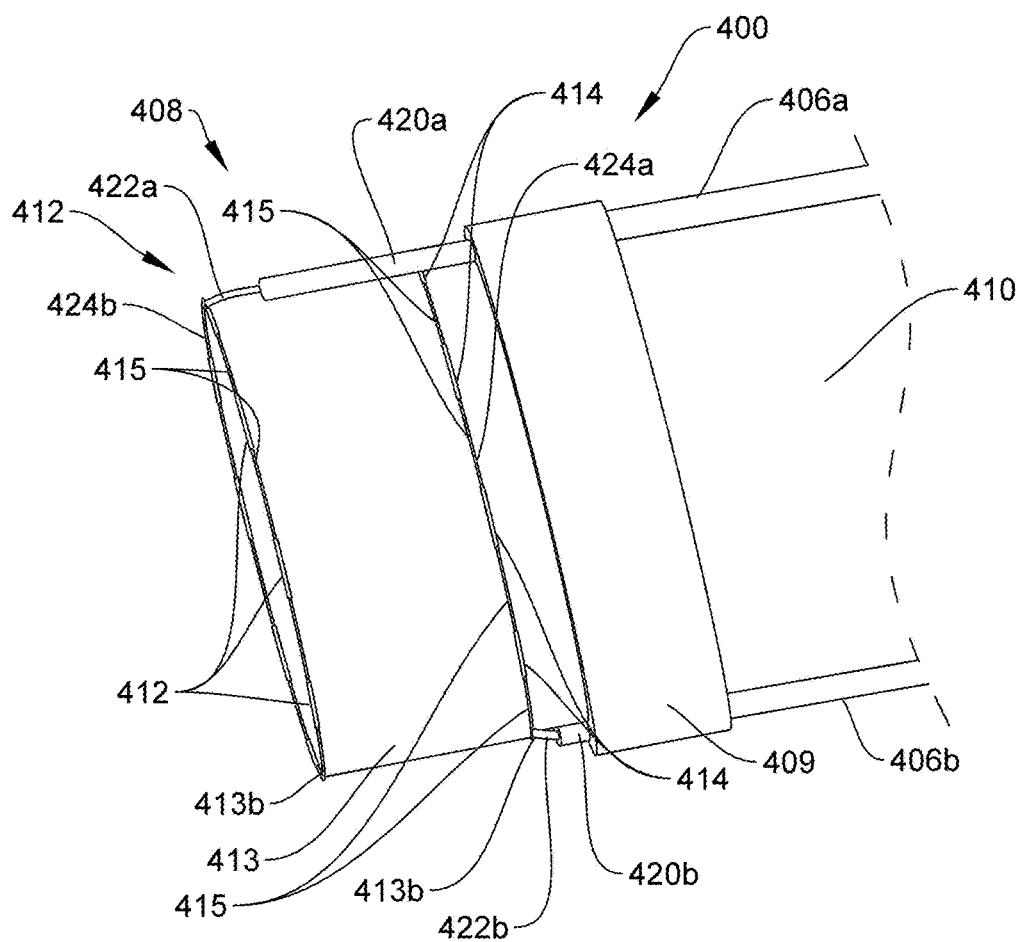
FIGS. 18A and 18B show a system according to yet another exemplary embodiment of the present disclosure.
Figure 18B:
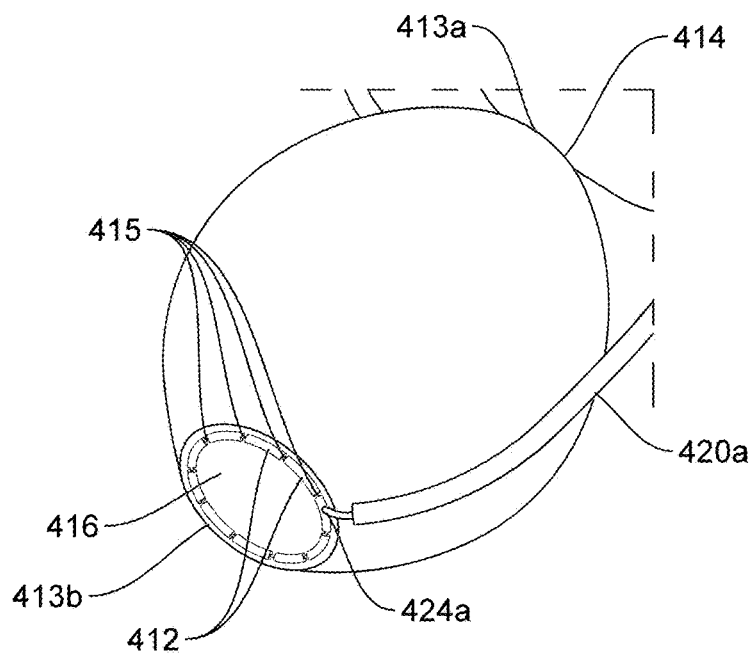

FIGS. 18A and 18B show a system 400 according to an exemplary embodiment of the present disclosure which is, except as specifically noted below, substantially similar in structure and operation to the previously described exemplary embodiments. The system 400 includes a handle similar to the handle 102 described above and an insertion section that, in this embodiment, includes first and second flexible members 406a, 406b that extend to a distal tissue capture device 408 that is configured to be mounted on the distal end of a flexible insertion device (e.g., a flexible endoscope 410).

The tissue capture device 408 includes a flange 409 that is configured to be fixed to a distal end of the insertion device (e.g., configured to be friction fit at a fixed location on a distal end of the endoscope 410) and a flexible tissue capture member 412 that, in this embodiment is formed as a bag or a sleeve 413 formed of a stretchable, flexible material such as rubber, silicon, a biocompatible plastic, such as Tyvek or Mylar, etc. The sleeve 413 of this embodiment is substantially cylindrical and includes first and second tubes 420a, 420b coupled to the proximal end 413a and the distal end 413b, respectively, with the first tubes 420a distributed around a circumference of the proximal opening 414 and the second tubes 420b distributed around a circumference of the distal opening 416. The first and second tubes 420a, 420b are separated from one another by gaps 415 so that, as the first and second loops 424a and 424b, respectively, are cinched tight to close the bag (in the same manner described above), the first and second tubes 420a, 420b can be drawn together to close the proximal and distal openings 414, 416 to seal tissue within the sleeve 413.

The sleeve 413 is configured to be received in an initial configuration on the distal end of the endoscope 410 (e.g., wrapped around the distal end of the endoscope 410 distal of the flange 409). Similarly to the above embodiments, each of the first and second flexible members 406a, 406b is formed as a hollow member within which each of the first and second tubes 420a, 420b is slidably received. Each of the first and second tubes 420a, 420b is hollow and slidably receives each of first and second control members 422a, 422b (e.g., a flexible wire) therein. When the distal opening 416 is fully cinched closed as in previous embodiments, the radially inward force applied to the tissue in the distal opening 416 severs this tissue from surrounding tissue leaving the target tissue captured within the sleeve 413.

Figure 19:
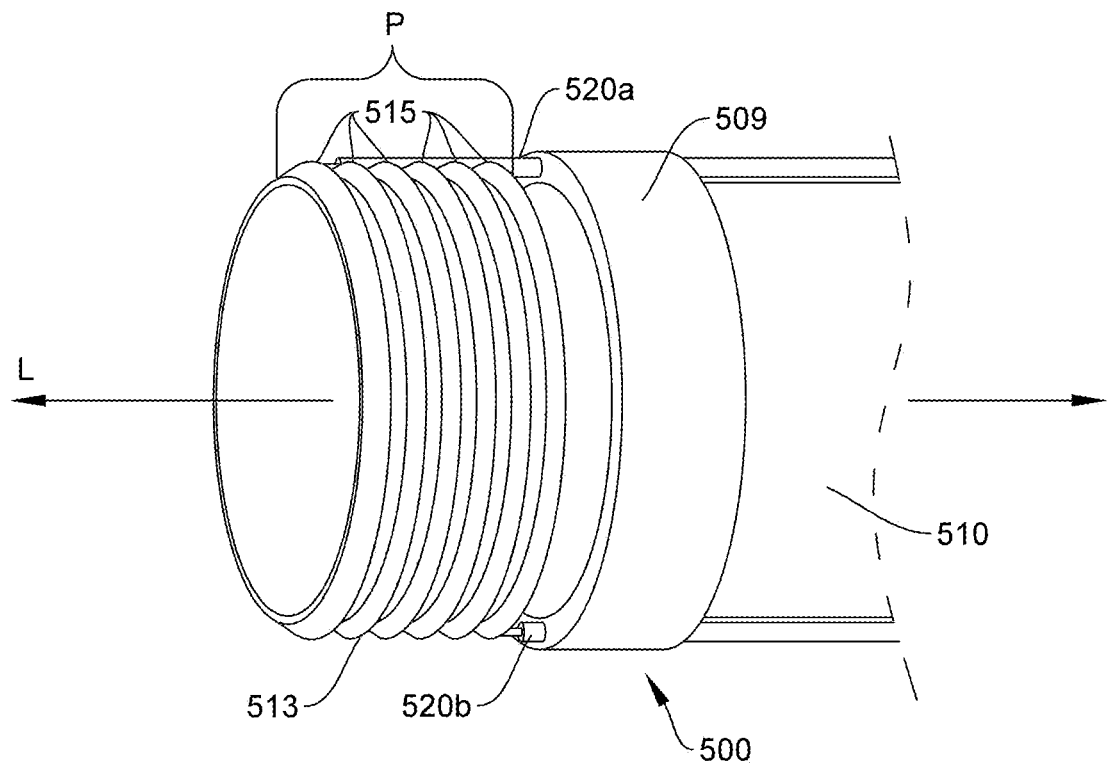
FIG. 19 shows a system according to a further exemplary embodiment of the present disclosure.

FIG. 19 shows a system 500 according to an exemplary embodiment of the present disclosure which is, except as specifically noted below, substantially similar in structure and operation to the previously described embodiments. The system 500 includes a sleeve 513 that is received, in an initial configuration, around the distal end of an endoscope 510. In this embodiment, the sleeve 513 is received on the distal end of the endoscope 510, in the initial configuration, with a bellows-like shape allowing for a sleeve 513 that has a length along a longitudinal axis L that is longer than a length of the portion P of the endoscope around which the sleeve 513 is received.

The sleeve 513 is folded in accordion folds 515 which, upon deployment of the sleeve 513 off of the endoscope 510 are smoothed out as the sleeve 513 is lengthened (e.g., by advancing the tube 520a distally relative to the tube 520b). In this embodiment, the folds 515 are formed so that the peaks of the folds 515 do not extend radially outward beyond the outer diameter of the flange 509. Thus, the outer profile of the system 500 is not increased beyond that of the flange 509.

Figure 20:
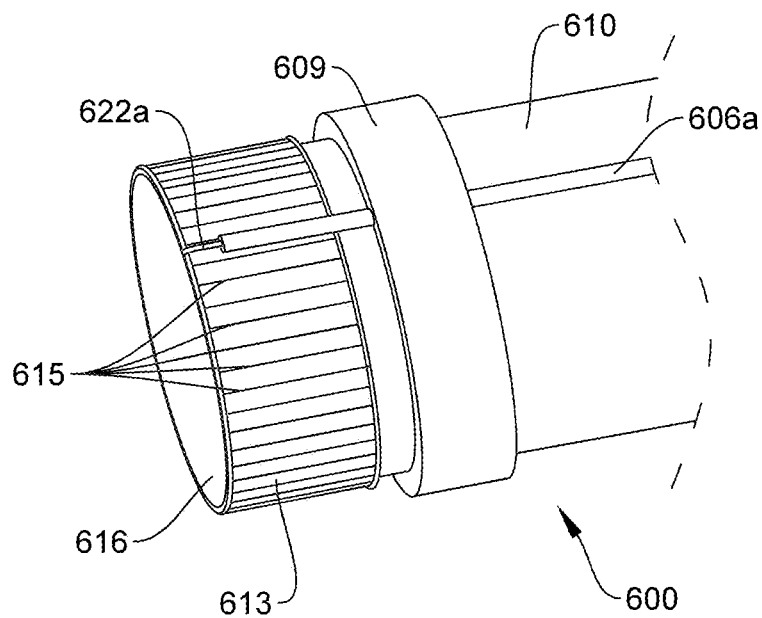
FIGS. 20 and 21 show a system according to yet another exemplary embodiment of the present disclosure.
Figure 21:
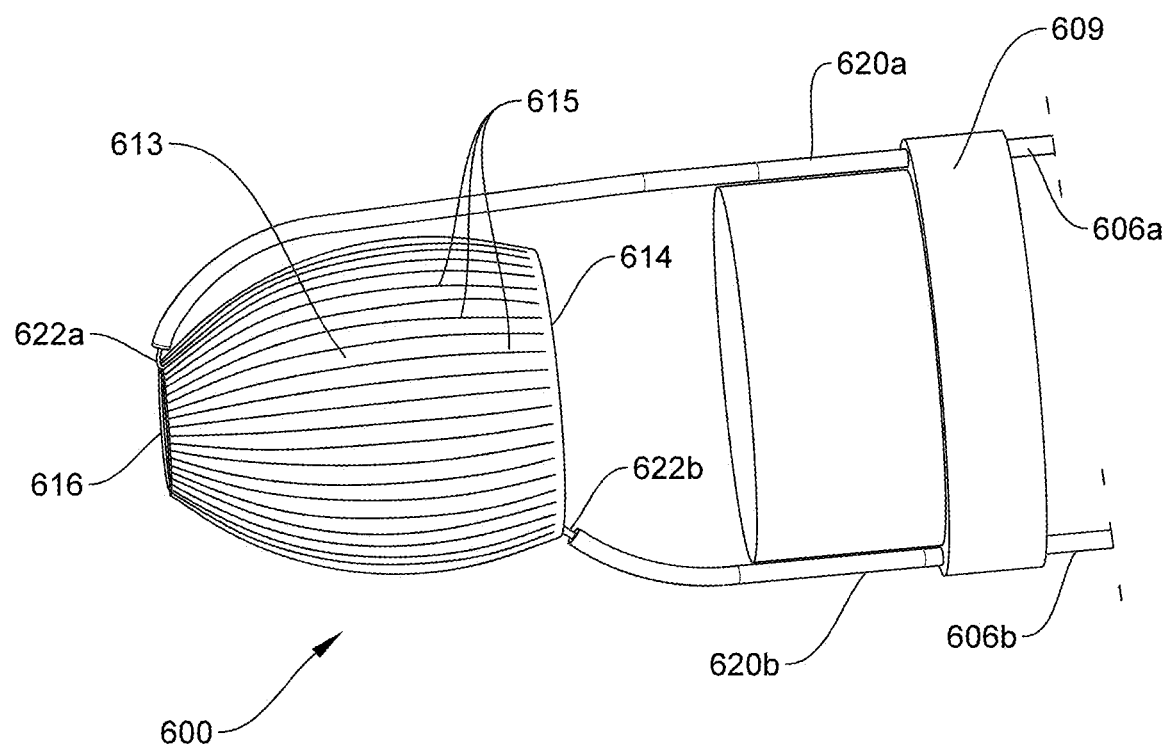

FIGS. 20 and 21 show a system 600 according to an exemplary embodiment of the present disclosure which is, except as specifically noted below, substantially similar in structure and operation to the previously described embodiments. The system 600 includes a flange 609, first and second flexible members 606a and 606b, first and second tubes 620a and 620b and a handle similar to the handle 102 as described above. The system 600 differs from the previously described embodiments in that the sleeve 613 includes a plurality of wires 615 embedded within the elastomeric material of the sleeve 613.

In this embodiment, the wires 615 are configured to bias the sleeve 613 to an open configuration in which the proximal opening 614 and the distal opening 616 are held open by the wires 615. For example, the wires 615 may be formed of Nitinol having a memorized shape corresponding to the open configuration. The sleeve 613 would then be closed by drawing the control wires 622a and 622b into the first and second tubes 620a, 620b as described above.

Alternatively, the wires 615 may be biased toward a closed configuration in which the proximal opening 614 and the distal opening 616 are closed. In such an embodiment, the sleeve 613 would be held open by being stretched around the distal end of the endoscope 610 and would close automatically (due to the bias of the wires 615) as soon as the sleeve 613 is moved off of the endoscope. The user would then constrict wire loops as described above to resect the tissue captured within the sleeve 613.

Figure 22:
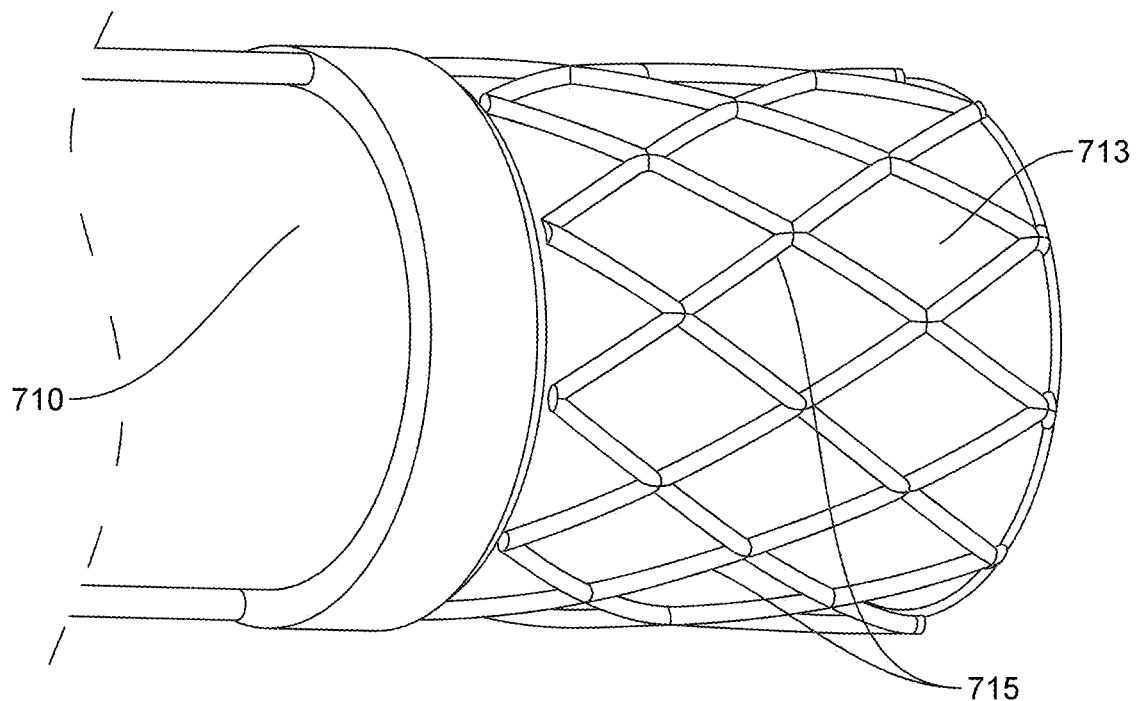
FIG. 22 shows a sleeve including a braid of wires of the system shown in FIGS. 20 and 21.

FIG. 22 shows a sleeve 713 including a wire braid 715 of wires that may be configured to bias the sleeve 713 open or closed in a manner similar to that described in regard to the wires 615 above. In this embodiment, the wire braid 715 may also be formed of nitinol biased or having a memorized shape configured to maintain the sleeve 713 in an open or closed configuration. Furthermore, in this embodiment, the wire braid 715 is covered with an elastic coating to minimize trauma to tissue that may be contacted by the outer surface of the sleeve 713 (e.g., during the insertion of the endoscope 710 to the target site within the body).

Figure 23:
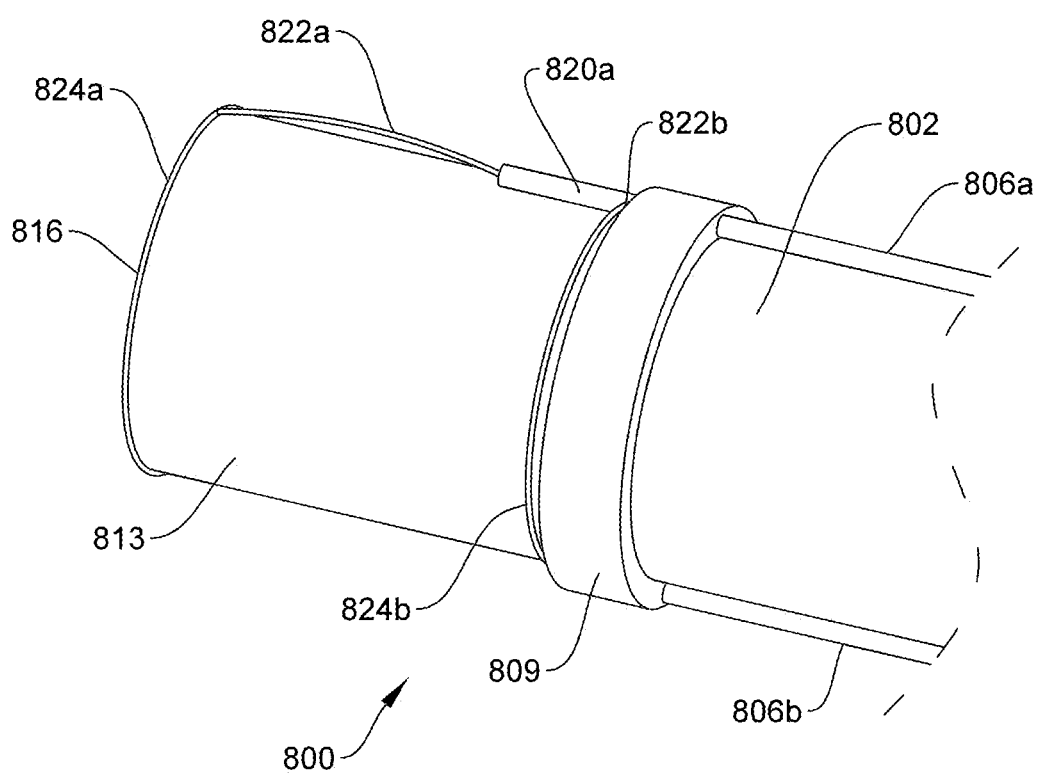
FIG. 23 shows a system according to yet another exemplary embodiment of the present disclosure.

FIG. 23 shows a system 800 according to an exemplary embodiment of the present disclosure which is similar in construction to the above-described embodiments except that this system is not designed for use with an endoscope or similar insertion instrument. In contrast, the system 800 is a catheter-based system for capturing and removing thromboses from blood vessels. The system 800 includes a catheter 802 with a sleeve 813 mounted on the distal end of the catheter 802 in a manner similar to the mounting of the sleeves of the earlier embodiments on an endoscope. As would be understood by those skilled in the art, the catheter 802 may in this embodiment be a braided catheter to enhance the kink resistance and column strength of the catheter 802 (e.g., to enhance the ability to push the catheter 802 to target sites within the body).

The system 800 includes a similar arrangement of first and second flexible members 806a and 806b and first and second tubes 820a and 820b extending from a handle similar to the handle 102 that remains outside the body to a flange 809 mounted on the distal portion of the catheter 802. In this embodiment, each of the control wires 822a and 822b extends through the corresponding one of the first and second tubes 820a, 820b, respectively, to control operation of first and second loops 824a, 824b respectively, in a manner substantially the same as that described for the previous embodiments. In this embodiment, the catheter 802 has a diameter of between 1 mm to 15 mm so that the catheter can be introduced into and through blood vessels to a site of thrombosis. The user would then capture the thrombosis in a manner similar to that described above in regard to the resection and capture of, e.g., a polyp.

In this case, a thrombosis may be captured by applying suction or introducing a mechanical grabbing device through the catheter 802 or in any other known manner. The sleeve 813 is then pushed off of the distal end of the catheter 802 over the thrombosis and the distal opening 816 is closed in a manner similar to that described in regard to any of the above-described embodiments. The catheter 802 along with the sleeve 813 and the thrombosis held therein can then be removed from the body.

It will be apparent to those skilled in the art that various modifications may be made in the present disclosure, without departing from the scope of the disclosure. Furthermore, those skilled in the art will understand that the features of any of the various embodiments may be combined in any manner that is not inconsistent with the description and/or the functionality of the embodiments.

What is claimed is:

1. A device for treating tissue, comprising:
 a tissue capture assembly removably attachable to an insertion device configured to be inserted to a target site within a living body, the tissue capture assembly including a tissue capture sleeve that, in an initial configuration, is removably received on a distal end of the insertion device and a flange that is removably mountable on the insertion device proximal of the tissue capture sleeve when the tissue capture sleeve is in the initial configuration;
 a first hollow member extending from a proximal end that remains, during use, outside the body accessible by a user to a distal end coupled to the flange;
 a first tube slidably received within the first hollow member and extending from a proximal end that remains, during use, outside the body accessible by the user distally beyond the flange to a first tube distal end, the first tube being configured to push the tissue capture sleeve distally off of the insertion device when the first tube is advanced distally through the first hollow member; and
 a first control member slidably received within the first tube and extending from a proximal end that remains, during use, outside the body accessible by the user to a distal end forming a first loop coupled around a circumference of a distal opening of the tissue capture sleeve, the first loop being configured to move between a constricted configuration in which at least a portion of the first loop is drawn proximally into the first tube and an open configuration in which the first loop is extended distally from the first tube to open the first loop and the distal opening of the tissue capture sleeve.

2. The device of claim 1, further comprising:
a handle including a handle body and a first actuator coupled to the proximal end of the first tube, wherein the first hollow member is coupled to the handle body and the first actuator is movably coupled to the handle body so that movement of the first actuator relative to the handle body moves the first tube proximally and distally within the first hollow member.

3. The device of claim 2, further comprising:
a second actuator coupled to the proximal end of the first control member, wherein the second actuator is coupled to the first actuator so that movement of the second actuator relative to the first actuator moves the first control member proximally and distally within the first tube.

4. The device of claim 2, further comprising:
a second hollow member extending from a proximal end that remains, during use, outside the body accessible by the user to a distal end coupled to the flange;
a second tube slidably received within the second hollow member and extending from a proximal end that remains, during use, outside the body accessible by the user distally beyond the flange to a second tube distal end, the second tube being configured to operate in conjunction with the first tube to push the tissue capture sleeve distally off of the insertion device when the second tube is advanced distally through the second hollow member; and
a second control member slidably received within the second tube and extending from a proximal end that remains, during use, outside the body accessible by the user to a distal end forming a second loop coupled around a circumference of a proximal opening of the tissue capture sleeve, the second loop being configured to move between the constricted configuration in which at least a portion of the second loop is drawn proximally into the second tube and the open configuration in which the second loop is extended distally from the second tube to open the second loop and the proximal opening of the tissue capture sleeve.

5. The device of claim 4, wherein the handle further comprises a third actuator coupled to the proximal end of the second tube, wherein the second hollow member is coupled to the handle body and the third actuator is movably coupled to the handle body so that movement of the third actuator relative to the handle body moves the second tube proximally and distally within the second hollow member.

6. The device of claim 5, further comprising:
a fourth actuator coupled to the proximal end of the second control member, wherein the fourth actuator is coupled to the third actuator so that movement of the fourth actuator relative to the third actuator moves the second control member proximally and distally within the second tube.

7. The device of claim 1, wherein the tissue capture sleeve includes an elastomeric loop coupled around a circumference of a proximal opening thereof, the elastomeric loop being biased toward a closed configuration so that, when the tissue capture sleeve is pushed distally off of the insertion device, the elastomeric loop pulls the proximal opening of the tissue capture sleeve closed.

8. The device of claim 1, wherein the tissue capture sleeve is formed of one of silicon and a biocompatible plastic.

9. The device of claim 8, wherein the tissue capture sleeve is formed of one of Tyvek and Mylar.

10. The device of claim 1, wherein the first loop is formed of a shape memory material configured so that, when the first loop is extended from the first tube, the first loop assumes an open loop shape to draw the distal opening of the tissue capture sleeve to the open configuration.

11. The device of claim 1, wherein the first loop is formed of a biocompatible metal biased so that, when the first loop is extended from the first tube, the first loop assumes an open loop shape to draw the distal opening of the tissue capture sleeve to the open configuration.

12. The device of claim 1, wherein the first loop includes a plurality of radially inwardly facing tissue cutting features.

13. A device for treating tissue, comprising:
a catheter including a tissue capture assembly mounted on a distal portion thereof, the tissue capture assembly including a tissue capture sleeve that, in an initial configuration, is removably received on a distal end of the catheter and a flange extending radially outward from an exterior of the catheter proximal of the tissue capture sleeve when the tissue capture sleeve is in the initial configuration;
a first hollow member extending from a proximal end that remains, during use, outside a living body accessible by a user to a distal end coupled to the flange;
a first tube slidably received within the first hollow member and extending from a proximal end that remains, during use, outside the body accessible by the user, distally beyond the flange to a first tube distal end; and
a first control member slidably received within the first tube and extending from a proximal end that remains, during use, outside the body accessible by the user to a distal end forming a first loop coupled around a circumference of a distal opening of the tissue capture sleeve, the first loop being configured to move between a constricted configuration in which at least a portion of the first loop is drawn proximally into the first tube and an open configuration in which the first loop is extended distally from the first tube to open the first loop and the distal opening of the tissue capture sleeve.

14. The device of claim 13, wherein the catheter is sized and shaped for insertion into a blood vessel and wherein the tissue to be targeted is a thrombus.

15. The device of claim 13, wherein the catheter is a braided catheter.

16. A method for capturing tissue, comprising:
inserting into a living body to a target site adjacent to the tissue to be treated, a tissue capture assembly removably attached to an insertion device with the tissue capture assembly including a tissue capture sleeve removably received on a distal end of the insertion device and a flange removably mountable on the insertion device proximal of the tissue capture sleeve, wherein the tissue capture sleeve is coupled to a first control member slidably received within a first tube with a first loop at the distal end of the first control member being coupled around a distal opening of the tissue capture sleeve;
drawing a target portion of the tissue toward a distal end of the insertion device;

moving the first tube distally to push the tissue capture sleeve distally off the insertion device so that the target portion of the tissue is received within the tissue capture sleeve;

drawing the first control member proximally into the first tube to cinch the first loop closed over a portion of the tissue adjacent to the target portion of the tissue until the first loop closes the distal opening of the tissue capture sleeve; and when a user determines that a portion of the tissue captured within the tissue capture sleeve has been captured as desired, drawing the first control member further proximally into the first tube to sever the target portion of the tissue from a surrounding portion of the tissue.

17. The method of claim 16, wherein the tissue capture sleeve is coupled to a second control member slidably received within a second tube with a second loop at the distal end of the second control member coupled around a proximal opening of the tissue capture sleeve further comprising drawing the second control member proximally into the second tube to cinch the second loop closed to close the proximal opening of the tissue capture sleeve.

18. The method of claim 17, further comprising:

maintaining the proximal and distal openings of the tissue capture sleeve closed as the insertion device is withdrawn from the body.

19. The method of claim 18, wherein the first tube is coupled to a first actuator on a handle and wherein the first control member is coupled to a second actuator on the handle so that actuation of the first actuator moves the first tube proximally and distally relative to the insertion device and wherein movement of the second actuator moves the first control member proximally and distally relative to the first tube.

20. The method of claim 16, further comprising:

observing, after the tissue capture sleeve has been deployed over the target portion of the tissue, the tissue within the tissue capture sleeve to determine if the target portion of the tissue has been captured as desired;

advancing, when the target portion of the tissue is determined not to have been captured as desired, the first control member distally out of the first tube to re-open the distal opening of the tissue capture sleeve;

withdrawing the tissue capture sleeve off of the tissue that had been previously captured after the distal opening of the tissue capture sleeve has been re-opened;

repositioning the insertion device;

drawing a subsequent target portion of the tissue toward a distal end of the insertion device;

moving the first tube distally to push the tissue capture sleeve distally off the insertion device so that the subsequent target portion of the tissue is received within the tissue capture sleeve; and drawing the first control member proximally into the first tube to cinch the first loop closed over the subsequent target portion of the tissue adjacent to the target portion of the tissue until the first loop closes the distal opening of the tissue capture sleeve.

\* \* \* \* \*